United States Patent
Neubeck

(10) Patent No.: US 12,086,121 B2
(45) Date of Patent: Sep. 10, 2024

(54) USING GEOMETRIC FILTERS TO FACILITATE SEARCHES WITH MINIMUM SPANNING TREES

(71) Applicant: Microsoft Technology Licensing, LLC, Redmond, WA (US)

(72) Inventor: Alexander Ulrich Neubeck, Obermichelbach (DE)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/879,471

(22) Filed: Aug. 2, 2022

(65) Prior Publication Data

US 2024/0054120 A1  Feb. 15, 2024

(51) Int. Cl.
 G06F 16/22 (2019.01)
 G06F 7/16 (2006.01)
 G06F 16/2455 (2019.01)

(52) U.S. Cl.
 CPC ............ G06F 16/2246 (2019.01); G06F 7/16 (2013.01); G06F 16/2264 (2019.01); G06F 16/24558 (2019.01)

(58) Field of Classification Search
 CPC ........... G06F 16/2246; G06F 16/24558; G06F 16/2264; G06F 7/16
 USPC ....................................................... 707/741
 See application file for complete search history.

(56) References Cited

U.S. PATENT DOCUMENTS

| | | | |
|---|---|---|---|
| 6,336,119 B1 * | 1/2002 | Banavar | ............. G06F 16/9027 |
| 10,169,359 B1 | 1/2019 | Pinho | |
| 11,010,257 B2 | 5/2021 | Wong | |
| 2006/0143218 A1 | 6/2006 | Ganguly | |
| 2006/0279749 A1 | 12/2006 | Zhang | |
| 2009/0204626 A1 | 8/2009 | Mustafa | |
| 2010/0325418 A1 | 12/2010 | Kanekar | |

(Continued)

FOREIGN PATENT DOCUMENTS

WO  2010093707 A1  8/2010

OTHER PUBLICATIONS

Bhalla, et al., "An Algorithm for Memory-Efficient Solutions to Large Graph MST Problems", Retrieved From: https://github.com/ArjunBhalla98/bloom-filter-prims/blob/ab6adfeaefa2d350c0add6abffc5a625aee07755/preliminary_paper.pdf, Dec. 11, 2020, 9 Pages.*

(Continued)

*Primary Examiner* — Giovanna B Colan
(74) *Attorney, Agent, or Firm* — Workman Nydegger

(57) ABSTRACT

Techniques for compressing a data set in a manner such that the data set is represented as a geometric filter are disclosed. Here, the geometric filter has a small memory footprint, thereby enabling the data set to be indexable without consuming a large amount of memory. One bits can be represented within a bit vector portion of the geometric filter or in an index portion of the geometric filter. Techniques are also provided to determine a level of similarity between two data sets, where the data sets have been compressed such that the data sets are representable as geometric filters. The data sets can be indexed without consuming large amounts of memory, and the similarity determination can be performed rapidly. Approximate minimum spanning trees (MSTs) are also generated to find an optimal compression for the data sets, such that the indexes are smaller and searching operations are faster.

20 Claims, 11 Drawing Sheets

(56) References Cited

U.S. PATENT DOCUMENTS

| | | |
|---|---|---|
| 2011/0029551 A1* | 2/2011 | Chen ................. G01D 3/08 |
| | | 711/170 |
| 2020/0117546 A1 | 4/2020 | Wong et al. |
| 2020/0147210 A1* | 5/2020 | Sade-Feldman ..... G01N 33/574 |
| 2020/0266829 A1 | 8/2020 | Evans |
| 2020/0287829 A1 | 9/2020 | Lam et al. |
| 2021/0271711 A1* | 9/2021 | Schlegel ............. G06F 16/9014 |
| 2024/0056569 A1 | 2/2024 | Neubeck |

OTHER PUBLICATIONS

Engels, et al., "Practical Near Neighbor Search via Group Testing", In Repository of arXiv:2106.11565v1, Jun. 22, 2021, 24 Pages.*
"Borůvka's algorithm", Retrieved from: https://en.wikipedia.org/wiki/Bor%C5%AFvka%27s_algorithm, Apr. 19, 2022, 4 Pages.*
U.S. Appl. No. 17/879,409, filed Aug. 2, 2022.
"RMP—Rust MessagePack", Retrieved from: https://crates.io/crates/rmp-serde, Retrieved Date: May 12, 2022, 3 Pages.
Gong, et al., "Space- and Computationally-Efficient Set Reconciliation via Parity Bitmap Sketch (PBS)", In Repository of arXiv:2007.14569v3, Aug. 15, 2020, 18 Pages.
Lemire, Daniel, "How fast is bit packing?", Retrieved from: https://lemire.me/blog/2012/03/06/how-fast-is-bit-packing/, Retrieved Date: May 12, 2022, 8 Pages.
Luo, et al., "Optimizing Bloom Filter: Challenges, Solutions, and Comparisons", In Journal of EEE Communications Surveys & Tutorials, vol. 21, Issue 2, Dec. 23, 2018, pp. 1912-1949.
"International Search Report and Written Opinion Issued in PCT Application No. PCT/US23/027451", Mailed Date: Sep. 27, 2023, 15 Pages.
"International Search Report and Written Opinion Issued in PCT Application No. PCT/US23/027449", Mailed Date: Oct. 6, 2023, 13 Pages.
Lemire, Daniel, "Xor Filters: Faster and Smaller Than Bloom Filters", Retrieved from: http://web.archive.org/web/20220420192150/https://lemire.me/blog/2019/12/19/xor-filters-faster-and-smaller-than-bloom-filters/, Dec. 19, 2019, 18 Pages.
Graf, et al., "Xor Filters: Faster and Smaller Than Bloom and Cuckoo Filters", In Journal of Experimental Algorithmics, vol. 25, Issue 1, Article 1.5, Mar. 13, 2020, 16 Pages.
Non-Final Office Action mailed on Jun. 21, 2024, in U.S. Appl. No. 17/879,409, 20 pages.

* cited by examiner

Geometric Bit-Bucket Distribution
400

Table With Unnormalized Joint Probabilities
500

| m\b | 0 | 1 | 2 | 3 | 4 | 5 |
|---|---|---|---|---|---|---|
| 0 | 1.00000000 | 0 | 0 | 0 | 0 | 0 |
| 1 | 0 | 1.00000000 | 0 | 0 | 0 | 0 |
| 2 | 0.00270761 | 0 | 0.99729061 | 0 | 0 | 0 |
| 3 | 0 | 0.00081032/ | 0 | 0.99189365 | 0 | 0 |
| 4 | 0.00002191 | 0 | 0.01612375 | 0 | 0.98385012 | 0 |
| 5 | 0 | 0.00010904 | 0 | 0.02666323 | 0 | 0.97322357 |
| 6 | 0.00000029 | 0 | 0.00032468 | 0 | 0.03957514 | 0 |
| 7 | 0 | 0.00000205 | 0 | 0.00074986 | 0 | 0.05467502 |
| 8 | 0.00000001 | 0 | 0.00000811 | 0 | 0.00148042 | 0 |
| 9 | 0 | 0.00000005 | 0 | 0.00002401 | 0 | 0.00262332 |
| 10 | 0 | 0 | 0.00000024 | 0 | 0.00005012 | 0 |

*Figure 5*

USING GEOMETRIC FILTERS TO FACILITATE SEARCHES WITH MINIMUM SPANNING TREES

BACKGROUND

There are various repositories that store software development information and other types of information. By way of example, GitHub is a software development storage platform where many millions of developers store their programs. GitHub can be used to store open source information, program information, or any other type of information. With that many different users, one can imagine the number of different documents that are also stored in the GitHub platform (i.e., many hundreds of millions of documents). The GitHub platform can include any number of repositories and any number of data sets.

Regardless of the type of storage repository, there are various challenges that present themselves when storing large amounts of data in repositories. For instance, some repositories present a non-linear history of files or file versions. In some cases, a repository can be structured as a tree or perhaps as an acyclic graph structure that describes the evolution of sets of files. That is, each node can represent the exact state of each file in the set. Additionally, the node has information about its predecessor states (e.g., from where it "evolved"). But it should be noted how the node does not necessarily store what changed. One can reconstruct that information by comparing the states represented by two nodes and looking for the difference.

With these various types of structures, a repository is a collection of all nodes. A branch (e.g., the main branch) can correspond to a named node. A branch can move over time by adding nodes to the graph, and a branch can optionally be pointed to a different node. In most cases, this new node will be a descendant of the previous node, but that is not a requirement. Accordingly, different nodes can be pointed to in the history, and different nodes or branches of nodes can be set as a default branch. In some cases, multiple branches can be operated on in parallel with one another. With the repository being structured in such a manner, it is generally the case that the repository is not configured to allow one to determine how similar different sets of documents or files are relative to other sets of files. Instead, the structure is primarily geared towards revealing the history and how the set of documents evolved over time. Such a structure does not lend itself well to allowing one to determine how many files have changed over time or how similar files are.

Because history by itself does not provide adequate information with regard to determining how similar sets of documents, files, or elements are relative to one another, what is needed, therefore, is an improved technique that can enable a developer or administrator to determine how similar one set of elements is relative to one or more other sets of elements. It is desirable to implement such techniques within the frameworks or repository structures described above.

Further complications arise when sets of elements are cloned versus when they are forked and when those elements are then stored in the hosting platform, which hosts any number of different data sets or repositories. Some traditional hosting platforms provide little to no context when dealing with cloned versions of data. What is needed, therefore, is an improved technique to intelligently and efficiently determine how similar one set of elements is relative to another set of elements, regardless of the genesis of that set (e.g., was it a clone, fork, etc.).

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments disclosed herein relate to systems, devices, and methods that compress a data set for indexing purposes and that provide an efficient searching technique to search for related data sets.

Some embodiments efficiently generate an approximate minimum spanning tree (MST) to enable a search to be performed through high-dimensional data sets to identify data sets that are similar to one another. As a result of using the MSTs, rapid searching can be performed even across the high-dimensional data sets. The embodiments access multiple data sets. For each data set, the embodiments generate a corresponding geometric filter such that multiple geometric filters are generated. Each geometric filter comprises a corresponding bit sequence. The embodiments generate an approximate MST for each mask over the plurality of data sets by performing, for a plurality of iterations, a number of operations. One operation includes using, for each iteration, a new bit mask to project the geometric filters from a first dimensional space to a second, lower dimensional space. As a result of this projection, multiple masked bit sequences are generated from the geometric filters. The bit masks are selected to ensure that a selected number of discrepancies between the geometric filters are compensated for. Another operation includes sorting the masked bit sequences based on a defined sorting order. The sorted, masked bit sequences are represented as nodes with a corresponding edge disposed between any two nodes. As a result of this sorting, nodes that are identified as being most common relative to one another are placed as neighboring nodes and are linked with a particular edge. Another operation includes calculating, for each respective pair of neighboring nodes, a corresponding edge cost based on a corresponding symmetric difference estimation between two corresponding geometric filters. The first neighboring node is associated with a first geometric filter, and the second neighboring node is associated with a second geometric filter. A geometric filter difference between the first geometric filter and the second geometric filter is linked with a particular edge that connects the first neighboring node with the second neighboring node. A combination of the nodes and edges constitute a respective MST that was generated for each new bit mask. The embodiments merge multiple MSTs, which were generated for each bit mask used during each iteration, together to generate a final MST for each respective data set.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 4 illustrates a geometric bit-bucket distribution.

FIG. 5 illustrates a table showing all the unnormalized joint probabilities $P(b, n)$.

DETAILED DESCRIPTION

Figure 1:
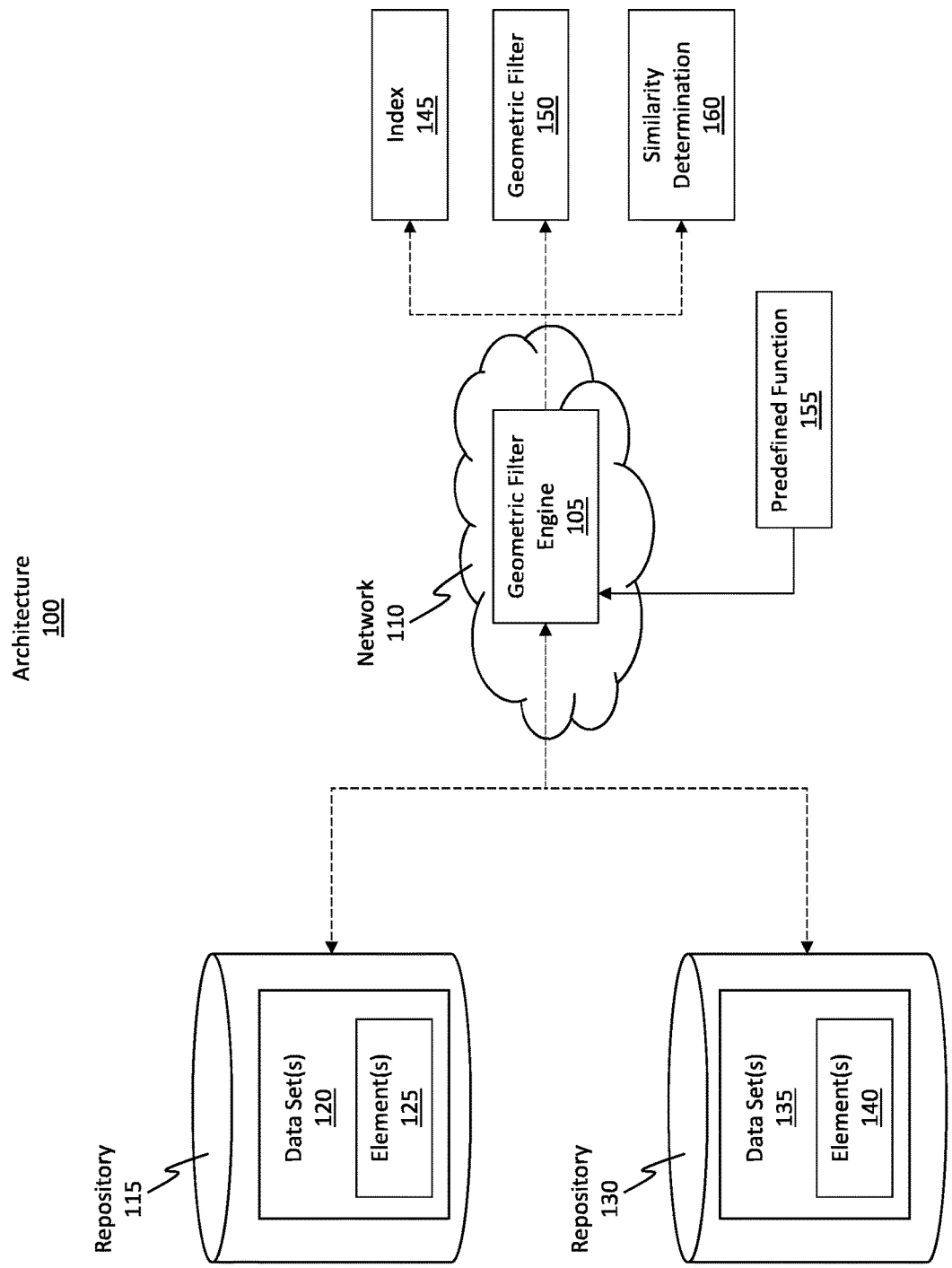
FIG. 1 illustrates an example architecture in which the disclosed principles can be practiced.

Embodiments disclosed herein relate to systems, devices, and methods that compress a data set for indexing purposes and that provide an efficient searching technique to search for related data sets.

Some embodiments efficiently generate an approximate minimum spanning tree (MST) to enable a search to be performed through high-dimensional data sets to identify data sets that are similar to one another. As a result of using the MSTs, rapid searching can be performed even across the high-dimensional data sets. The embodiments access multiple data sets. For each data set, the embodiments generate a corresponding geometric filter such that multiple geometric filters are generated. Each geometric filter comprises a corresponding bit sequence. The embodiments generate an approximate MST for each mask over the plurality of data sets by performing, for a plurality of iterations, a number of operations. One operation includes using, for each iteration, a new bit mask to project the geometric filters from a first dimensional space to a second, lower dimensional space. As a result of this projection, multiple masked bit sequences are generated from the geometric filters. The new bit mask is selected to ensure that a selected number of discrepancies between the geometric filters are compensated for. Another operation includes sorting the masked bit sequences based on a defined sorting order. The sorted, masked bit sequences are represented as nodes with a corresponding edge disposed between any two nodes. As a result of this sorting, nodes that are identified as being most common relative to one another are placed as neighboring nodes and a linked with a particular edge. Another operation includes calculating, for each respective pair of neighboring nodes, a corresponding edge cost based on a corresponding symmetric difference estimation between two corresponding geometric filters. The first neighboring node is associated with a first geometric filter, and the second neighboring node is associated with a second geometric filter. A geometric filter difference between the first geometric filter and the second geometric filter is linked with a particular edge that connects the first neighboring node with the second neighboring node. A combination of the nodes and edges constitute a respective MST that was generated for each new bit mask. The embodiments merge each data set's multiple MSTs, which were generated for each bit mask used during each iteration, together to generate a final MST for each respective data set.

Examples of Technical Benefits, Improvements, and Practical Applications

The following section outlines some example improvements and practical applications provided by the disclosed embodiments. It will be appreciated, however, that these are just examples only and that the embodiments are not limited to only these improvements.

The disclosed embodiments provide numerous benefits, advantages, and practical applications to the technical field of big data management (e.g., hundreds of millions of data elements). The embodiments are beneficially configured to operate on one or more repositories and one or more sets of data elements within those repositories to determine how similar one set of elements is relative to another set of elements. It is often the case that repositories include overlapping or similar data. Being able to identify which data sets are similar will thus significantly help with managing the repository. The disclosed embodiments describe various techniques for determining similarities between different snapshots or sets of data that are to be indexed within the repositories.

By performing the disclosed principles, the efficiency of the computer system is significantly improved. In particular, the disclosed embodiments present an efficient data compression technique that allows large volumes of data to be represented in a highly compact, compressed manner (i.e. in the form of a geometric filter). Additionally, the embodiments can beneficially use this compact data (i.e. the geometric filter) to then perform different comparison operations to determine how similar one set of data is relative to another set. By using the compact data, the similarity analysis operations can be performed much faster and can consume significantly fewer computing resources than techniques that perform traditional data comparison operations (e.g., element-level comparison techniques). In this sense, the actual functionality of the computer system itself is improved.

Building on the above benefits, the embodiments further improve the technical field by converting the data compression and data similarity analysis to a data "set" problem. In other words, the embodiments beneficially restate the similarity problem in terms of set operations, such as by solving similarity search requests over sets.

As will be described in more detail later, another benefit revolves around the accuracy of the system in determining the level of similarity. Notably, the accuracy of the similarity estimate actually increases the more similar the two sets become. While that statement may sound simplistic, many similarity determining techniques fail to increase accuracy as the similarity between sets increases.

As mentioned above, yet another benefit of the disclosed principles relates to the ability to ensure that small sets can be represented more compactly than large sets. In practice, the resulting compact formation of data will consume less space than the original set representation. Thus, the embodiments help improve data management and data storage.

Yet another benefit relates to the ability of the disclosed embodiments to reduce the dimensionality of the data sets that are being operated on, thereby also further simplifying the computing operations and making the computer operate more efficiently. Accordingly, these and numerous other benefits will now be described throughout the remaining portions of this disclosure.

Figure 6:
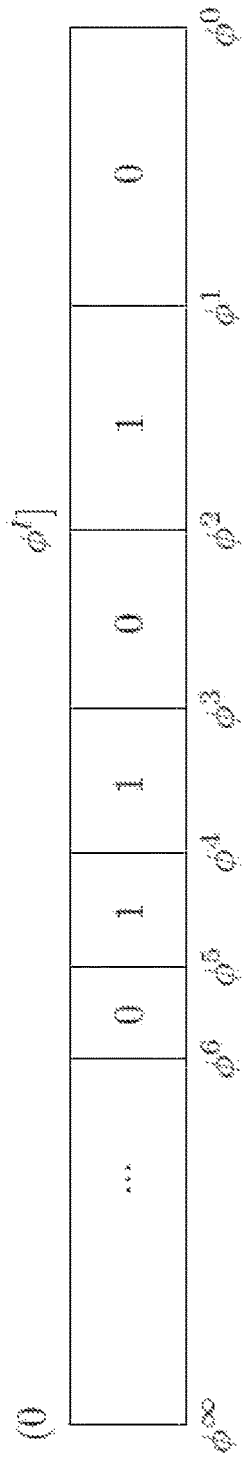
FIG. 6 illustrates a scenario showing the observed B left-most one bits. In this scenario, B one bits are counted in the range $(0, \phi 2]$. Since the next bucket also stores a one bit and thus exceeds the limit B, 1 equals 2 for this example.
Figure 7:
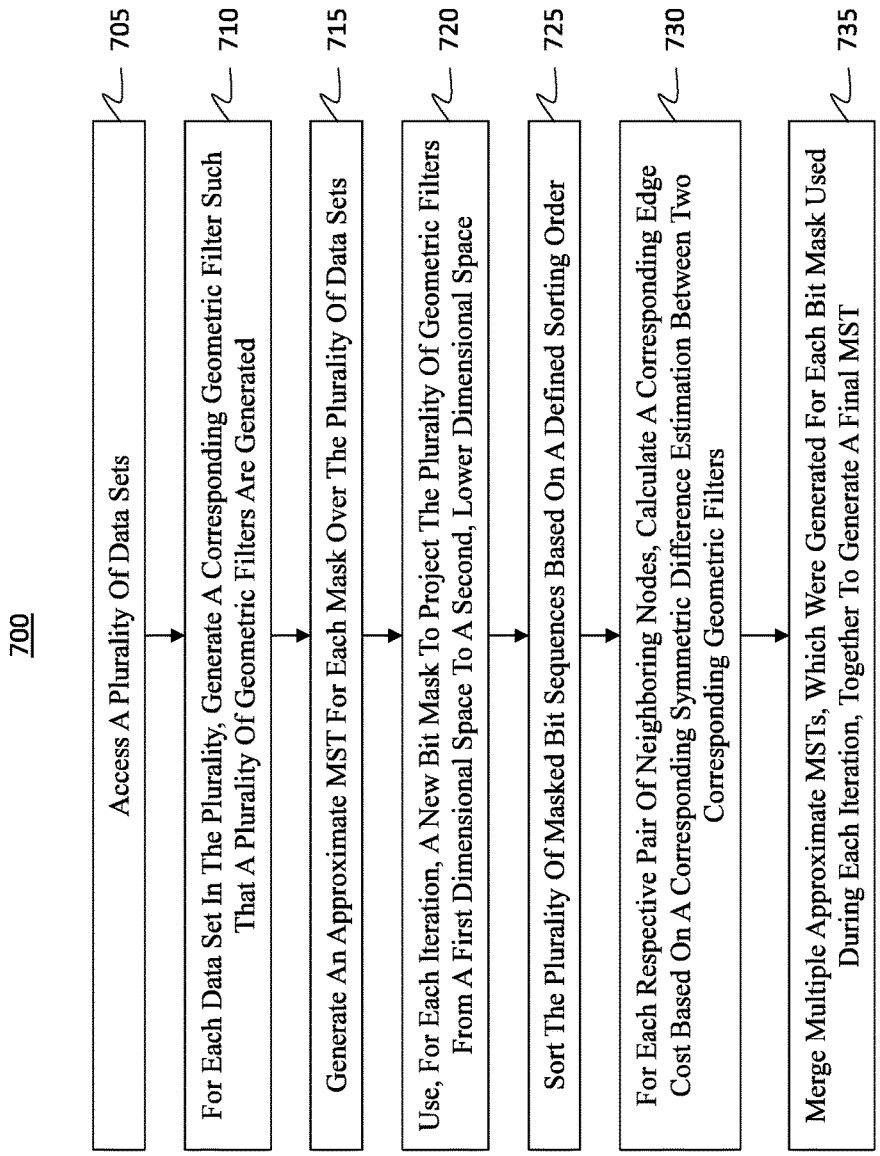
FIG. 7 illustrates a flowchart of an example method for generating minimum spanning trees for high-dimensional data sets.

This disclosure is organized in the following manner. First, a discussion regarding the various architectural features of the embodiments will be presented with regard to FIG. 1. Various method acts, which can be performed within the architecture of FIG. 1, will then be described in FIGS. 2A, 2B, 3A, and 3B. Notably, the discussion with regard to FIGS. 1, 2A, 2B, 3A, and 3B provide a high level overview of various features and functionalities of the disclosed embodiments. The remaining discussion provides a deep dive into various features and functionalities of the embodiments. FIGS. 4, 5, and 6 provide supporting illustrations for this in-depth discussion. Thus, an overview description will first be provided, and a detailed discussion will then follow. FIG. 7 illustrates an example computer system that can be configured to perform the disclosed operations.

Example Architecture

Having just described some of the various benefits of the disclosed embodiments, attention will now be directed to FIG. 1, which illustrates an example architecture 100 in which the embodiments may be practiced.

Generally, it is desirable to be able to index 100s of millions of data sets that may be distributed across any number of repositories. Indexing all repositories or all these data sets independently is too costly during crawling, indexing, and serving when done via brute force efforts. Indeed, such operations would either overload the servers or take an exorbitant amount of time to crawl over the elements in the data sets. Indexing and processing all of that data would make the system incredibly expensive and/or slow. Therefore, a solution to such difficulties is to index just the differences (or deltas) between two repositories and then subsequently index those changes.

To make such a delta indexing operable, it is desirable to be able to quickly find repositories that are sufficiently similar, or that have a level of similarity that does not exceed a predefined threshold. That is, the embodiments are able to find a second repository (or data set) that is most similar to a first repository (or data set). Using a threshold is one optional way to achieve this similarity determination. Later, the MST-based approach can be performed without using a threshold. The disclosed embodiments enable such operations to be performed via the use of a so-called "geometric XOR filter" (or simply "geometric filter"). The disclosed geometric filter beneficially allows for compressing data; beneficially allows for quickly estimating the similarity between two repositories; and beneficially allows performing various searching operations.

In general the embodiments can be viewed as solving the following problem: given a set of n entities, compute a summary of the set which consumes $O(\log(n))$ memory in $O(n)$ time. The embodiments are able to estimate the similarity between two sets of $O(n)$ size in $O(\log(n))$ amount of time. The embodiments are also able to derive an index that allows for efficiently iterating through all indexed sets, particularly those that do not differ by more than T entities from a given set. To find the nearest neighbor (i.e. the one having the most similar data set), it is possible to create multiple indices with different values T. Notably, by using the sorting idea used to construct the MST approach (discussed later), it is not necessary to pick a T at all.

Beneficially, the disclosed operations are probabilistic, and the embodiments are flexible in allowing one to choose the expected false positive rate. In this regard, one (among many) major benefits provided by the disclosed embodiments is that the embodiments are able to index data structures in a quick and efficient manner. By following the disclosed principles, bits represented by the geometric filter can be translated into an index that can then be used to search for other sets with a certain similarity.

FIG. 1 shows an example geometric filter engine 105, which can optionally be implemented within a network 110, such as perhaps a cloud environment. As used herein, the phrases "geometric filter" and "geometric XOR filter" can be interchanged with one another. In some implementations, the geometric filter engine 105 can be or can include a machine learning algorithm.

The geometric filter engine 105 can be implemented as a service that can communicate, optionally over any type of network, with any number of repositories. As one example, the geometric filter engine 105 can communicate and interface with the repository 115.

The repository 115 can optionally be structured as having an acyclic graph structure or as a tree. In some cases, the repository 115 can be structured in accordance with the GitHub platform. In some cases, the repository 115 is structured so as to not present a linear history of files or file versions.

The repository 115 is shown as including any number of data set(s) 120, where each data set includes one or more data element(s) 125. Examples of such element(s) 125 include, but are not limited to, data files, folders, or even bytes within a single file.

The geometric filter engine 105 is also shown as communicating and interacting with the repository 130. Similar to repository 115, the repository 130 includes any number of data set(s) 135, where each data set includes any number of element(s) 140.

In accordance with the disclosed principles, the geometric filter engine 105 is able to generate a compressed representation of each data set in a repository. This compressed representation can then be used to index 145 that data set within the repository. The compressed representation of a data set is shown as being the geometric filter 150, which can be created using a predefined function 155 and a mapping operation (both of which will be discussed in more detail later). The geometric filter engine 105 can generate compressed representations of any number of the data sets in any of the repositories. In some cases, the geometric filter engine 105 can generate a compressed representation even for an entire repository.

Having generated any number of indexes, or compressed representations, the geometric filter engine 105 can then use those indexes (i.e. geometric filters) to determine a level of similarity that exists between one data set and another data set. Data sets located within the same repository can be compared, and data sets located in different repositories can be compared. The similarity determination 160 generally represents this functionality. By performing the disclosed operations, the embodiments are able to significantly improve how data is stored and managed as well as how data is visualized in a compressed manner. Furthermore, the embodiments are beneficially able to perform data similarity comparisons in a highly efficient and fast manner. The architecture 100 can be used to generate geometric filters, which include a dense part (e.g., a bit vector) and a sparse part (e.g., an index value). The architecture 100 can also be used to facilitate the similarity comparison to determine a size of the symmetric difference, or rather, an estimate of the size difference, that exists between different data sets. Typically, the embodiments do not compute the actual elements that differ between the data sets.

Example Method for Generating a Bit Vector

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 2A:
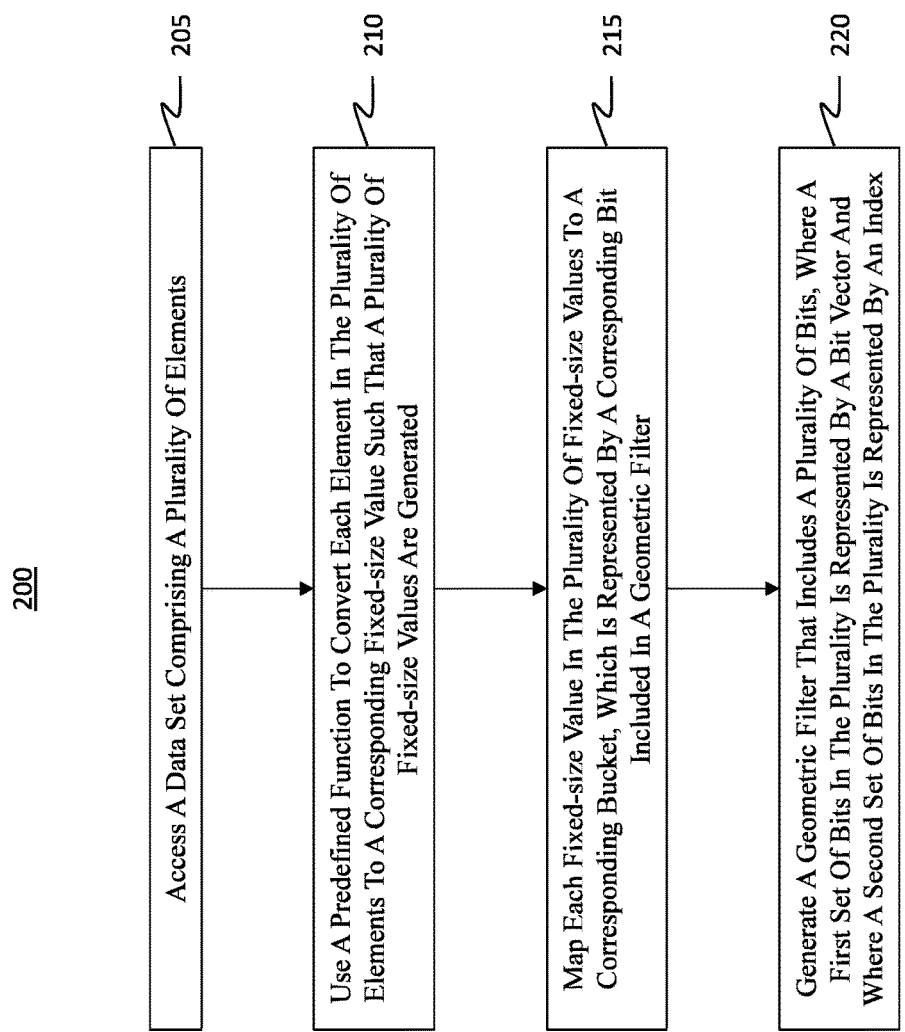
FIG. 2A illustrates a flowchart of an example method for compressing a data set in a manner such that the data set is represented as a geometric filter that includes a bit vector and an index value (e.g., one or more index values, which can also be a list of one or more bit positions). That is, the geometric filter includes two parts, a sparse part and a dense part. The sparse part is represented by the index values, and the dense part is represented by the bit vector.
Figure 2B:
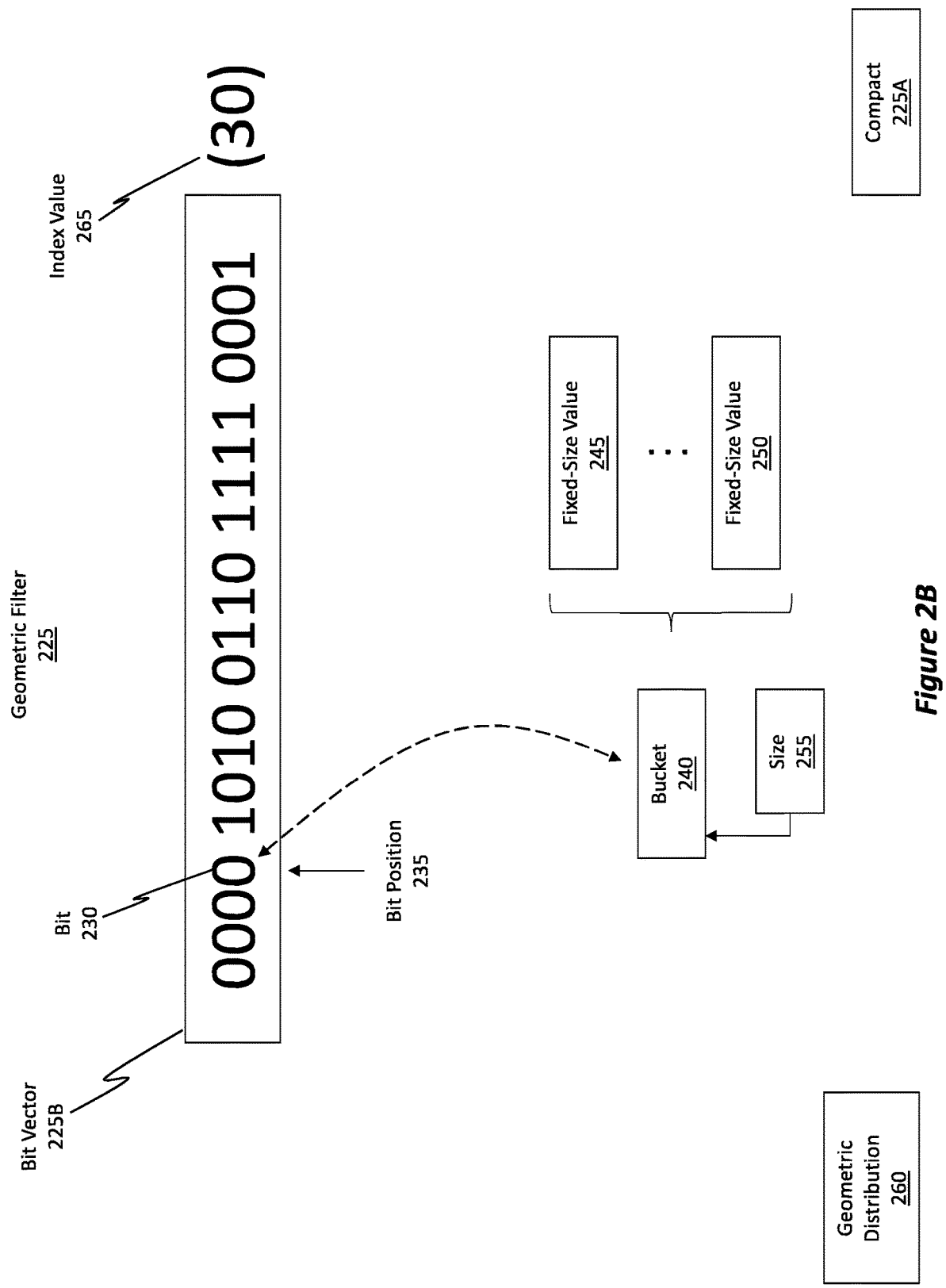
FIG. 2B illustrates an example of both the sparse part and the dense part of the geometric filter.

Attention will now be directed to FIG. 2A, which illustrates a method 200 for compressing a data set in a manner such that the data set is represented as a geometric filter, where the geometric filter has a small memory footprint, thereby enabling the data set to be indexable without consuming a large amount of memory. Method 200 can be implemented within the architecture 100 of FIG. 1. Further, method 200 can be performed by the geometric filter engine 105.

Act 205 includes accessing a data set comprising a plurality of elements. As an example, the geometric filter engine 105 can access the data set(s) 120 of FIG. 1, where that data set includes the element(s) 125. In some cases, the elements in the data set are files. In some cases, the data set itself is a file, and the elements in the data set correspond to lines, words, or bytes of the file. Optionally, the sizes of the elements can be arbitrary. In some cases, the number of elements in the data set can exceed 1,000,000 elements. Of course, more or less elements can also be present in a data set. Indeed, some data sets include multiple millions of elements.

Act 210 includes using a predefined function to convert each element in the plurality of elements to a corresponding fixed-size value. As a result, a plurality of fixed-size values are generated. Optionally, the predefined function can be a hash function. In such a scenario, the resulting "fixed-size value" can then be a hash value. Optionally, each hash value can be an unsigned 64-bit integer.

As will be described shortly, the embodiments are able to generate a geometric filter. A geometric filter can represent a data set in a compact manner. The geometric filter includes a dense portion and a sparse portion. The dense portion is represented via a bit vector while the sparse portion is represented as a list of one or more bit positions.

In a pure mathematical interpretation, the geometric filter can optionally have infinitely many bits. But, in practice, it is the case that only a finite number of one bits can be set (e.g., since toggling a finite number of bits can only lead to a finite number of one bits). Due to the geometric nature, there will actually be much less one bits in the final geometric filter than the number of bit toggling operations that are performed. In order to represent the one bits compactly, the embodiments cause the geometric filter to include two parts: the sparse part and the dense part. The former is represented by just listing the index positions of the one bits explicitly. The latter is represented by a bit vector. Due to the geometric representation and the assumption that elements get mapped to "random" fixed-size values, the sparse representation can simply cover the first k one bits (where k is a small number like 20). That is, if the distribution of fixed-size values is uniform, the sparse representation can simply cover the first k bits. This achieves the optimal compression under the above assumptions.

Each of the bits has a corresponding bit position within the geometric filter. For example, turning briefly to FIG. 2B, a geometric filter 225 is illustrated. The geometric filter 225 represents a data set in a compact 225A manner. The geometric filter 225 includes multiple bits. Some of the bits are represented within the bit vector 225B, such as bit 230. Bit 230 is identified as being at bit position 235 within the bit vector 225B (e.g., the bit position is fourth from the left). That is, the embodiments start with a "fixed value" and map that to a bit position, such that the mapping follows a geometric distribution.

Each bit position represents a corresponding bucket of fixed-size values such that a plurality of buckets are represented by the geometric filter. For instance, in FIG. 2B, the fixed size value is associated with a bucket 240, which is represented via the bit 230. The bucket 240 is mappable to a range of fixed-size values. To illustrate, the bucket 240 is mappable to the fixed-size value 245, the fixed-size value 250, and potentially any number of fixed-size values therebetween. In this regard, each bucket is mappable to at least one, though potentially more, fixed-size values.

Notably, bucket sizes (e.g., bucket size 255 in FIG. 2B) of the plurality of buckets follow a geometric distribution 260 relative to one another. As a result, a range of fixed-size values that are mappable to each bucket is dependent on the geometric distribution 260.

By way of example, a first bucket in the plurality of buckets is mappable to a first range of fixed-size values. Further, a second bucket in the plurality of buckets is mappable to a second range of fixed-size values. In this scenario, the second range is smaller than the first range due to the geometric distribution 260. Beneficially, the corresponding range for each bucket is modifiable in terms of size. In some embodiments, the ranges for the buckets are non-overlapping with one another, and the ranges can fully cover all possible fixed-size values.

Returning to FIG. 2A, act 215 includes mapping each fixed-size value in the plurality of fixed-size values to a corresponding bucket, which is represented by a corresponding bit included in the geometric filter. The process of mapping each fixed-size value to its corresponding bucket is performed by toggling a corresponding bit in the geometric filter. Further, as a result of this mapping operation, the data set is caused to be represented in a compressed form (e.g., a geometric filter) that is indexable. In some cases, the process of mapping each fixed-size value to its corresponding bucket includes performing a logarithmic operation. That is, the disclosed geometric filter is able to split an interval (0, 1] into infinitely many, non-overlapping buckets whose sizes follow a geometric distribution based on a defined set of one or more parameters (e.g., the bucket i covers interval (d^(i+1), d^i]), where d is a suitably chosen parameter greater than 0 and less than 1, which determines the geometric distribution for the geometric filters.

An example will be helpful. Consider a scenario where a first bit has a value of one. Here, that value indicates that an odd number of the fixed-sized values mapped to a first bucket corresponding to the first bit.

Further, consider a scenario where a second bit in the bit vector has a value of zero. Here, that value indicates that an even number of the fixed-sized values mapped to a second bucket corresponding to the second bit.

It may be the case that some fixed-size values map to buckets that can be better represented using an index (i.e. a list of bit positions) as opposed to using bits within the bit vector. Therefore, a scenario may occur where fixed-size values map to buckets that are not representable by bits included in the bit vector, as shown by the index value 265 in FIG. 2B. Thus, the geometric filter can represent bits using a sparse technique (e.g., the index value 265) and using a dense technique (e.g., the bit vector 225B).

Returning to FIG. 2A, method 200 then includes an act (act 220) of generating the geometric filter. The geometric filter includes a first set of bits that are represented by a bit vector and includes a second set of bits that are represented by an index.

It is often the case that data sets are similar to one another in a repository. For instance, one data set might be a forked version or perhaps a duplicate version of another data set. That is, two data sets may differ somewhat in their elements, but those two data sets may be quite similar to one another. For instance, a data set can have added elements or deleted elements as compared to another data set. The process of adding or deleting an element from a data set can optionally result in a toggle of a particular bit included in the bit vector, where the particular bit represents a particular bucket that corresponds to a particular fixed-size value that was generated for the added or deleted element. Regarding "toggling," if the bit position already exists in the sparse portion, the bit position gets removed from the list. If it did not exist, then it gets added. If the number of one bits becomes too large or too small (exceeding a threshold), one bits are moved from the dense to the sparse portion or vice versa.

Beneficially, the geometric filter consumes or has a relatively small footprint in terms of memory space or memory consumption, especially as compared to the size of the original data set. The geometric filter consumes O(log(n)) amount of memory, where "n" is the size of the data set.

As mentioned above, more details regarding the generation of the geometric filter will be provided in later sections. These initial discussions and figures are provided by way of introduction into the operations of the disclosed embodiments.

Example Method for Conducting a Similarity Operation Using Bit Vectors

Figure 3A:
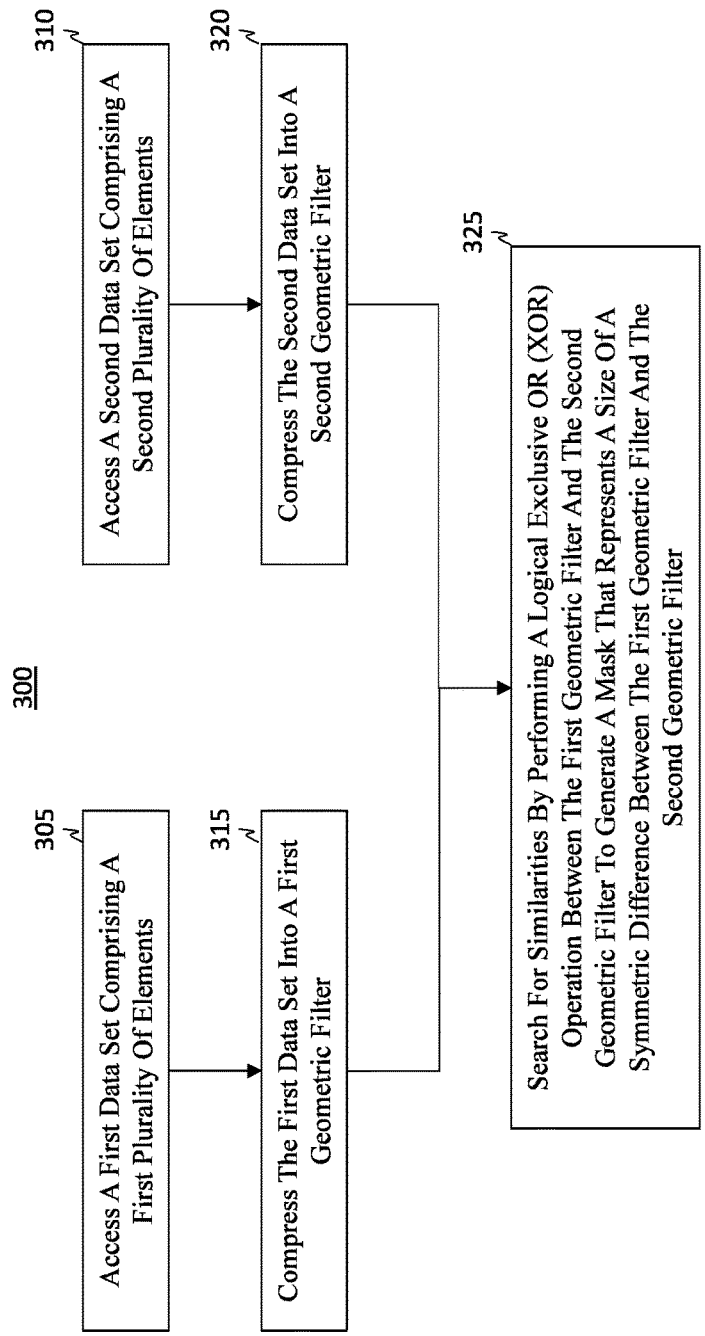
FIG. 3A illustrates a flowchart of an example method for determining a level of similarity between two data sets, where the data sets have been compressed such that the data sets are representable as geometric filters and where the geometric filters have small memory footprints, thereby enabling the data sets to be indexable without consuming large amounts of memory and thereby enabling the similarity determination to be performed rapidly.

Attention will now be directed to FIG. 3A, which illustrates a flowchart of an example method 300 for determining a level of similarity between two data sets, where the data sets have been compressed such that the data sets are representable as geometric filters and where the geometric filters have small memory footprints, thereby enabling the data sets to be indexable without consuming large amounts of memory and thereby enabling the similarity determination to be performed rapidly. By way of further clarification, the data sets may have been compressed via the operations recited in connection with method 200 of FIG. 2A.

Act 305 includes accessing a first data set comprising a first plurality of elements. For instance, the geometric filter engine 105 from FIG. 1 can access the data set(s) 120.

Act 310 includes accessing a second data set comprising a second plurality of elements. For instance, the geometric filter engine 105 can also access the data set(s) 135. Acts 305 and 310 are shown as being performed in parallel with one another. In some cases, the acts are performed in parallel while in other cases they are performed in serial. In some cases, the acts are performed asynchronously relative to one another.

Figure 3B:
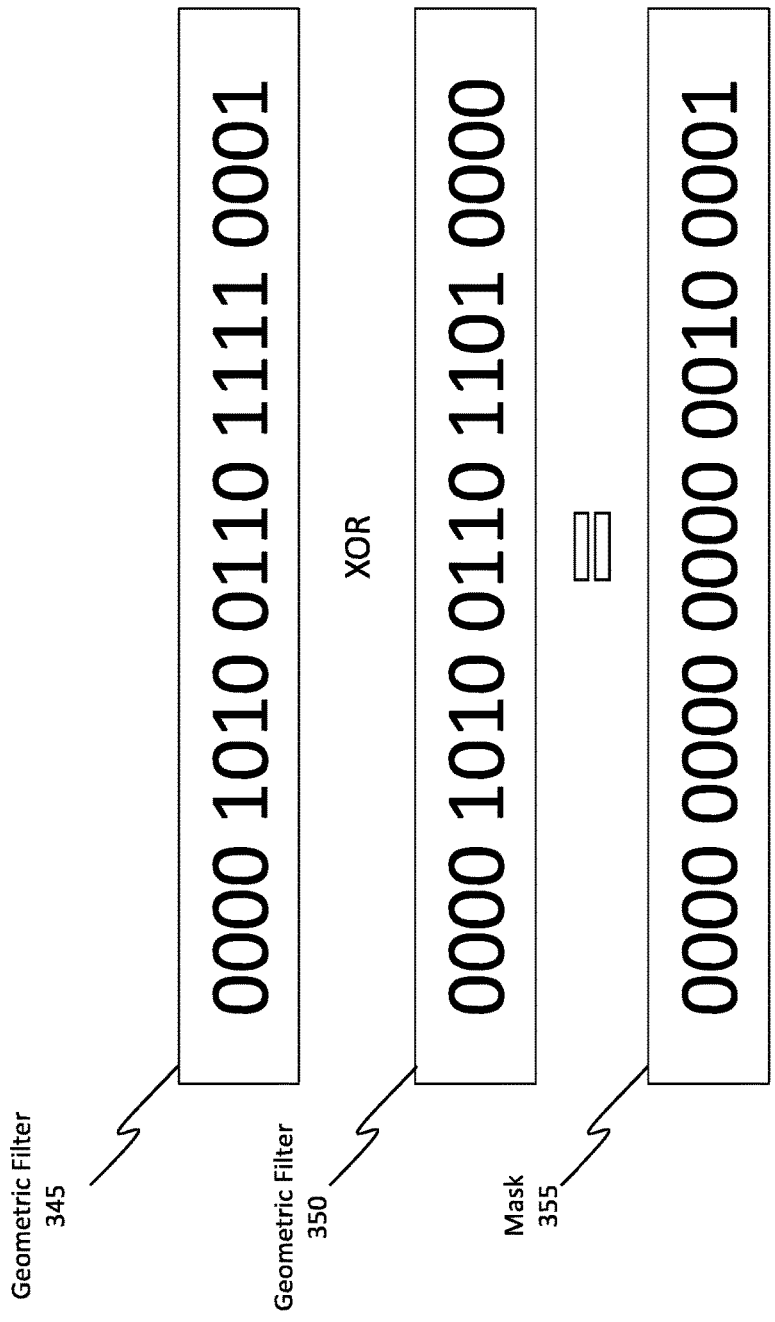
FIG. 3B illustrates an example of the logical exclusive OR (XOR) operation that can be performed using the generated geometric filters.

Act 315 includes compressing the first data set into a first geometric filter. This compression process can be performed by implementing the method 200 on this first data set. With reference to FIG. 3B, the geometric filter 345 can be representative of this first geometric filter.

Similarly, act 320 includes compressing the second data set into a second geometric filter. As above, this compression operation can be performed by implementing the method 200 on this second data set. With reference to FIG. 3B, the geometric filter 350 can be representative of this second geometric filter. The geometric filters can include a bit vector portion (illustrated) and one or more index values (not illustrated, aka a list of bit positions).

The embodiments perform a logical XOR operation using the two geometric filters and then estimate the size of the resulting mask (aka a bit sequence, which is another geometric filter). The size is estimated by determining the position of the k-th one bit. This bit position enables the embodiments to upscale the estimated k to the full (hash) space. If there are not k one bits, then the embodiments just count how many one bits there are and look up the corresponding size estimate for this specific number of one bits. This look up can be realized via a precomputed look up table or via a function that approximates the values in this look up table.

To illustrate, act 325 includes searching for similarities between data sets by performing a logical exclusive OR (XOR) operation between the first geometric filter and the second geometric filter to generate a mask (aka bit sequence) that represents a size (estimated) of the symmetric difference between the first geometric filter and the second geometric filter. The similarity between the two geometric filters is estimated by determining the k-th differing bit between the first geometric filter and the second geometric filter. The embodiments also compare the representations (i.e. the geometric filters) from most to least significant bits. With reference to FIG. 3B, the mask 355 can be representative of the result that is generated in response to performing the XOR operation between the two geometric filters. Notice, in this scenario, the XOR operation revealed only two bit-wise differences between the two geometric filters. Accordingly, by performing the disclosed operations, the embodiments are able to estimate a size of the symmetric difference between different data sets.

Accordingly, the disclosed geometric filter is able to split an interval (0, 1] into infinitely many, non-overlapping buckets whose sizes follow a geometric distribution based on a defined set of one or more parameters (e.g., the bucket i covers interval ($d^{(i+1)}$, $d^i$]), where d is a suitably chosen parameter greater than 0 and less than 1, which determines the geometric distribution for the geometric filters (in FIG. 4, phi is represented as φ) In some implementations, the value of phi can be $(½)^{128}$. An element of the represented data set is uniformly (and independently) hashed to a floating point h number in the interval [0, 1). Its corresponding bucket can be found with $\log_{phi}(h)$ (where a floor function is used to truncate the fractional part of the floating point number to determine the bucket index). The embodiments then assign every bucket a single bit. Inserting or removing an element to or from the set results in toggling the bit of the corresponding bucket. The symmetric set difference between two sets can be computed by performing a logical exclusive OR (XOR) operation on all bits of the corresponding bucket representations in the geometric filters.

The size of the data set can be estimated by iterating through bits having values of one from the largest-position to the smallest-position bucket (or left-to-right, as illustrated in FIG. 4). Once the 128-th 1 bit is found at index i, the iteration can stop. Notably, the value "128" is optional and that value is dependent on phi. For instance, if phi=$(½)^k$, then the number should ideally be k. That being said, a smaller k can be used if speed is more important than precision. The size is then roughly $C/phi^i$ where C is some fixed number. If there are less than 128 "1" bits, there is a lookup table with the precomputed size estimates.

The geometric filter can be stored compactly by encoding the first ~20 "1" bit positions explicitly as integers. The remaining buckets can be represented with a simple finite bit array. This way, the total size of the geometric filter becomes $O(\log(n))$ where n is the number of elements in the data set.

The parameter phi determines the precision and size of the geometric filter. The achieved precision can be traded off against the size. When performing a similarity search, the embodiments construct an index from the geometric filter as follows:

1. The embodiments determine a desired similarity threshold T for the search. That threshold corresponds to a bucket position t and all buckets at positions less than t can be ignored during this search.

2. The embodiments partition all the remaining buckets (i.e. with bucket positions larger or equal to t) into a selected number of partitions or bits (e.g., perhaps 20). There are various ways to construct such a partitioning. An optional aspect here is that all partitions can cover roughly the same space in the original (0, 1] space. In some cases, these partitions do not have to consist of consecutive buckets.

3. The embodiments extract, for each geometric filter and partition, the bits falling into that partition. The embodiments then index those bits (e.g., by hashing the bit pattern into a smaller token name).

4. The embodiments can do the same for a geometric filter that is to be searched (i.e. the bit vector can be referred to as the geometric filter). Here, however, the embodiments can use the index to find a geometric filter that has the very same bit patterns for a selected number of the partitions (e.g., perhaps 10 of the 20 partitions). Those are likely within the desired similarity range T. To increase the confidence, the embodiments can compute the actual similarity estimate between all those candidates.

This procedure can now be generalized to all T by picking a specific partitioning scheme which reuses or shares as much information between the different Ts as possible.

The partition scheme would first group x (e.g., 6) consecutive buckets togethers. A partition starting at group g, consists of that group g, group g+20, group g+40, and so on. By construction, this partitioning satisfies the above properties and is very efficient in terms of computation. This construction also works for all T that are relevant in practice (e.g., moving T just by one bucket would essentially return the same candidates, therefore it is sufficient to let T start at every k-th bucket).

In practice, it is often desirable to find the most similar geometric filter. In that case, the embodiments can start with some guess for T and can refine that T via, for example, a binary search where the number of found results determines whether T should be increased or decreased. Notably, a larger T will find geometric filters that were found with a lower T as well. Further details on these aspects will now be discussed in more detail below.

In-Depth Description of a Geometric XOR Filter

The disclosed embodiments are directed to a geometric XOR filter (aka "geometric filter"), which is a probabilistic cardinality estimator. As a brief description regarding the properties or attributes of the disclosed geometric XOR filter, let F(A) denote a function that converts a set A into its corresponding geometric XOR filter. Also, let σ denote the desired accuracy (standard error). Assuming those parameters, then the disclosed geometric XOR filter has the following properties:

Property (1): XOR (=Toggle) single item
(a) $F(A) \oplus F(\{b\}) = F(A \ominus \{b\})$, where $A \ominus B = (A \cup B) \setminus (A \cap B)$.
(b) Amortized time complexity: O(1)

Property (2): XOR (=Symmetric Difference)
(a) $F(A) \oplus F(B) = F(A \ominus B)$
(b) Time complexity: $O(\log |A| + \log |B| + 1/\sigma^2)$.

Property (3): Counting
(a) $count(F(A)) \approx |A|$ with accuracy σ.
(b) Time complexity: $O(1/\sigma^2)$.

Property (4): Space consumption: $O(\log |A| + 1/\sigma^2)$.

The first property can be used to convert a set A in O(|A|) time into a geometric XOR filter. This property can also be used to keep the filter in sync while adding or deleting elements from a set. Since the filter does not distinguish (on purpose) between additions and deletions and since the filter does not determine which specific elements exist in a set, it is beneficial to make sure that elements are not inserted twice into the filter. Doing so would essentially remove that element again.

The second and third properties can be used to estimate the dissimilarity between two sets. It is worthwhile to note that the accuracy of the estimate increases the more similar the two sets become. This is because the symmetric difference decreases at the same time, and the accuracy of the count operation depends only on the size of the symmetric difference.

The fourth property ensures that small sets can be represented more compactly than large sets. In practice, the filter will essentially always consume less space than the original set representation.

There are various other solutions to the probabilistic cardinal estimation problem. For example, the HyperLogLog technique is one solution. The Min-Hash technique is another solution.

There are various fundamental differences between the disclosed geometric XOR filter technique and these other existing techniques. In particular, those other techniques are designed to count distinct elements, thereby ignoring reinsertions of elements. However, this property comes at the cost that deletions of elements are not supported by those existing techniques.

By taking advantage of an inclusion-exclusion principle $|A \cap B|=|A|+|B|-|A \cup B|$, one can still estimate the dissimilarity or symmetric difference between two sets in the following manner:

$|A \oplus B|=|A \cup B|-|A \cap B|=2|A \cup B|-|A|-|B| \approx 2$ count(HLL $(A) \cup HLL(B))$-count(HLL(A))-count(HLL(B))

However the accuracy of the above estimation is relative to the size of the original sets A and B and their union $A \cup B$. In other words, the more similar the two sets become, the less accurate the result will be, which is a downfall for traditional systems. The embodiments, on the other hand, provide increased accuracy as the similarities between data sets increase. It should be noted that it is not practical to increase the accuracy of the estimator by increasing its filter size, since estimators typically consume about 4 times more space in order to double their precision.

As an extreme example, imagine two sets with one million items that differ in only one item. In this case, the HyperLogLog filter would need an accuracy of 1 million-th, which would require about 1 trillion log-log counts. Comparing the original 1 million items directly would obviously be much more efficient.

The disclosed geometric XOR filter can handle this case with just 300 bytes. The above equation can also be applied in the reverse direction to estimate the size of the union $A \cup B$ via the geometric XOR filter. Since the union becomes a sum ½ ($|A|+|B|+|A \oplus B|$) of multiple estimates, the estimated union size will have the same (relative) precision as each of its summands.

Mathematical Description

The geometric XOR filter can be thought of as an infinite sequence of nonoverlapping buckets where the i-th bucket covers the interval $(\phi^{i+1}, \phi^i]$ where $I \in N_0$. By definition, all buckets are non-overlapping and completely cover the interval (0, 1]. Stated differently, the ranges for the buckets are non-overlapping with one another, and the ranges for the buckets fully cover the whole range of possible values. FIG. 4 illustrates those buckets and their corresponding interval limits, as shown by the geometric bit-bucket distribution 400.

The geometric XOR filter F(A) of a finite set $A=\{a_1, \ldots, a_n\}$ is defined by counting for each bucket F(A)$_i$ the number of items being hashed into it modulo 2, as represented below:

$$\mathcal{F}(A)_i = \left[\bigoplus_k h(a_k) \in (\phi^{i+1}, \phi^i]\right]$$

where h(a) is a hash function mapping an item a to the interval (0, 1]. Here, [x] is the Iverson bracket, shown below.

$$[x] = \begin{cases} 1 & \text{if } x \text{ is true} \\ 0 & \text{otherwise} \end{cases}$$

By way of further clarification, the above operation describes a mapping operation in which a hash value h(a) is mapped to its bit positions i. In other words, the embodiments are able to map each fixed-size value (e.g., the hash value) to one of the buckets, and this mapping operation includes mapping each fixed-size value to a corresponding bit position in a bit vector. This mapping is mathematically defined by the following:

$$i = \left\lfloor \frac{\log h(a)}{\log \phi} \right\rfloor$$

One issue with the above formula is that it relies heavily on floating point operations and their precision. Thus, when a 100% reproducible result is required (like consistency of this mapping across many software releases and hardware platforms), a different approach might be warranted.

In that regard, assume that the hash value h is given as an unsigned 64-bit integer and that $\phi$ is as follows:

$$\sqrt[k]{0.5} \text{ for some integer } k > 0$$

In other words, the first k bits cover half the hash space, the next k bits a quarter, and so on. Furthermore, one can interpret the 64-bit integer as a fractional binary number with 64 binary digit0.xxx . . . .

This way, the number of leading zeros l directly determines the bit position up to multiples of k, i.e. hash is 0.1xxx . . . map to bit positions [0, k), 0.01xxx . . . to [k, I), 0.001xxx . . . to [2k, 3k), and generally l leading zeros map to bit positions [lk, (l+1)k). Note, that the leading zeros can be directly determined from the unsigned 64-bit integer.

It remains to determine the position within the interval [lk, (l+1)k). This position can be determined by looking at the remaining 63–l many bits. These remaining bits can be extracted via a left shift by l+1 bits. For instance the fractional representation 0.001xxx . . . with two leading zeros becomes 1.xxx . . . after the left shift. This new number f can now again be thought of as a fractional number which falls into one of the k intervals which, given the hash value h as a floating point number $h=2^{-e}m$ and $$\phi = \sqrt[k]{0.5},$$

the formula for computing the corresponding bit position simplifies to:

$$i = \left\lfloor \frac{\log_2 h}{\log_2 \phi} \right\rfloor = \lfloor k(e - \log_2 m) \rfloor = ke + \lfloor -k \log_2 m \rfloor$$

This formulation allows for the computation of i more directly when h is given as a 64-bit integer number. Here, e simply equals the number of leading zeros of that 64-bit integer number. And the mantissa can be computed with a simple left shift of h by e+1. Note, that this drops the leading one bit.

Next, it is beneficial to replace the logarithm computation of m with a lookup table, since there are only k many distinct outcomes after the floor operation:

$$j = \lfloor -k \log_2 m \rfloor \Leftrightarrow \sqrt[k]{0.5}^{j+1} < m \leq \sqrt[k]{0.5}^j$$

The k+1 interval limits $$\sqrt[k]{0.5}^j, 0 \leq j \leq k$$

can be stored in a vector, and the logarithm computation can be replaced with a binary search over those interval limits. The binary search can actually be replaced by a lookup with the following observation: the largest and smallest intervals differ by at most factor 2. Therefore, the search range can be split into 2k many intervals and each such interval is covered by at most two geometric buckets. By storing the touching point of the two buckets and their indices, it is possible to get to the correct bucket in constant time.

Returning to the earlier equation, the symbol ⊕ is the logic XOR operation. This definition implies the following properties:

Property (1): The bucket index i=b(a) into which an item a falls can be computed via the following:

$$h(a) \in (\phi^{i+1}, \phi^i] \Leftrightarrow \phi^{i+1} < h(a) \leq \phi^i \Leftrightarrow i+1 > \frac{\log h(a)}{\log \phi} \geq i \Leftrightarrow i = \left\lfloor \frac{\log h(a)}{\log \phi} \right\rfloor$$

Property (2): The bucket sizes follow a geometric distribution and thus the probability $p_i$ of hashing an item into the i-th bucket is $$p_i = \phi^i - \phi^{i+1} = \phi^i(1-\phi)$$

Property (3): All buckets are set to zero for the empty set.

$$\forall i: F(\emptyset)_i = 0$$

Property (4): Exactly one bucket is set to 1 for a single item set {a}.

$$\mathcal{F}(\{a\})_i = \begin{cases} 1 & \text{if } h(a)x \in (\phi^{i+1}, \phi^i] \\ 0 & \text{otherwise} \end{cases}$$

Property (5): The symmetric difference between two sets corresponds to XOR-ing their buckets.

$$F(A \ominus B)_i = F(A)_i \oplus F(B)_i$$

Property (6): Adding or deleting an item to a set just toggles the bit of its corresponding bucket.

$$\mathcal{F}(A \oplus a)_i = \mathcal{F}(A)_i \oplus \begin{cases} 1 & \text{if } h(a)x \in (\phi^{i+1}, \phi^i] \\ 0 & \text{otherwise} \end{cases}$$

Specific Example

A specific example will be helpful. Suppose dataset A includes the following elements:
Dataset A: {"a", "b", "c", ... }.
The geometric XOR filter for dataset A will include the hashes of dataset A. As examples only, suppose the hashes for the elements in dataset A are as follows:
GeometricFilter for A: hashes(Dataset A)={100, 80, 30, ... }

Those hash values will now be translated to bit positions within a vector by taking the log with a base of the hash values, as represented by the example values provided below:
Bit Positions By Taking $\log_{phi}$ (hash values)={10, 8, 4, ... }
The resulting bit vector may look as follows (with reversed order to align with the above description):
Geometric Filter A: ... 010100010000
The values in these bit positions can be toggled to reflect whether elements are the same across datasets via the XOR function. Additionally, in some cases, a selected number of the bits (e.g., a selected number of bits on the lefthand side of the bit vector) can be stored as indexes. A selected number of other bits (e.g., a selected number of bits on the righthand side of the bit vector) can be stored in the form of the vector.

Typically, the righthand bits correspond to large buckets and will not be efficiently compressed, so those bits remain in vector form. On the other hand, the lefthand bits correspond to very small buckets, and the probability of mapping elements to these buckets is quite small, so it is advantageous to not represent those bits in the vector and instead simply represent each bucket whose bit is set to 1 via a corresponding index.

By way of further explanation, starting from the right and going to the left, the first 12 bit positions cover a very large interval of the hash space, and the remaining bits (represented generally via the ellipsis) cover a very small range of hashes (i.e. buckets), but there is a very large number of these small buckets. Such concepts reflect the geometric distribution aspect described previously.

Storing all of these small buckets in the bit vector when they are likely to have a bit value of 0 is overly burdensome and thus can be avoided by simply storing them as respective indexes when a bit value of 1 occurs. An example will be helpful.

Instead of the geometric filter representation provided above, suppose the geometric filter resulted in the following values:
GeometricFilter for A: hashes(Dataset A)={10000, 100, 80, 30, ... }
The bit positions might be as follows:
Bit Positions By Taking log_phi (hash values)={30, 10, 8, 4, ... }
Similarly, the resulting geometric filter would be as follows, with the indication of the index:
Geometric Filter A: (30, 10) 100010000
Where the (30) represents the index for the 30 bit position and where the (10) represents the index for the 10 bit positions, both of which correspond to very small buckets of hashes. In this sense, outlier bit positions (e.g., the embodiments encode "x" largest one bits) can be stored as an index that is associated with the geometric filter.

By performing the above processes, the embodiments are able to generate a compressed representation of a repository of information. This simplified representation can then be used as a basis for a subsequent comparison process to determine a level of similarity between two repositories. That is, the disclosed geometric XOR filter operations allow the embodiments to quickly estimate the similarity between two repositories. These operations can also be used to solve a searching problem via the implementation of a unique indexing process.

As another example, suppose a repository has a set of n entities. The embodiments are able to compute a summary of the set in a manner that consumes only O(log(n)) amount of memory and that consumes only O(n) amount of time. The embodiments are further able to estimate the level of similarity between this set and another set in O(log(n)) amount of time. The embodiments are further able to derive an index that allows for the efficient iteration through all indexed sets that do not differ by more than a specified number of entities. Beneficially, all of these operations are probabilistic, and the expected false positive rate can be selected to a desired level.

To continue with the above example, consider now a scenario where the dataset A is to be compared against another dataset, such as dataset B, to determine the level of similarity that exists between these two datasets.

Dataset B: {"a", "b", "d", ... }

The embodiments implement the geometric XOR filtering process by computing a hash for the various different elements in dataset B, as shown by the example hash values below:

GeometricFilter for B: hashes(dataset B)={100, 90, 80, 30, ... }

These hash values will then be mapped to corresponding bit positions, as shown below.

Bit Positions By Taking $\log_{phi}$ (hash values)={10, 9, 8, 4, ... }

The resulting geometric filter is illustrated below:
Geometric Filter B: 11100010000

A comparison between the geometric filter A and the geometric filter B will reveal that there are two bit-level differences, as illustrated by the bolded and underlined entries below:

Geometric Filter A: (30, 10) 100010000
Geometric Filter B: (10, 9) 100010000

The two bit-level differences make sense because the embodiments computed a symmetric difference. Here, the "c" element was removed and the "d" element was added in the repository B, thereby resulting in the difference of two. The symmetric difference between dataset A and dataset B is then shown below as a result of performing the logical XOR function on the two geometric filters:

Symmetric Difference (Mask) Between A and B:(30, 9) 0

What this means, then, is that the estimated difference between these two datasets includes two symmetric differences because there are two 1 bits that differ but nothing else is different. If a threshold number of 1 bits were identified (e.g., perhaps a threshold of ten 1 bits), then the embodiments can optionally stop looking for additional 1 bit values and instead perform an extrapolation operation from the bit position that resulted in the scenario where the threshold was exceeded. The extrapolation operation is beneficial because at some point lower-position bits in the XOR'ed geometric filter representation will become random for a large enough symmetric difference.

In an extreme case, for instance, if there is a difference of 10,000 elements between the dataset A (which might have 1 million elements) and the dataset B (which might also have 1 million elements), then the resulting large hash buckets, which are represented by the bit positions in the above geometric filters, will get hit a random number of times with the elements that are different between the two datasets. This scenario essentially breaks down to a 50% chance of the bits having a 1 value or a 0 value. Thus, the embodiments beneficially stop if a threshold number of 1 bit values are detected, so as to avoid the above scenario.

Regarding the extrapolation process (when it is performed), the relevant information is what is the position of the x-th most significant one bit, and that position enables the embodiments to determine when to upscale. The bit is upscaled by the range that was covered. Further details on this upscaling operation will be provided later.

Estimating the Number of Elements Represented by the Geometric XOR Filter

This section derives formulas to estimate the number of elements represented by the geometric XOR filter based on the number of one bits $\beta_k = \Sigma_{i \geq k} \mathcal{F}(A)_i$ observed in the buckets i≥k. In other words, this section describes how to convert identified "1" bits that are included in the resulting XOR'ed bit vector to an estimated number of elements that are different between the two data sets.

The first step is to compute the joint probability distribution $P(\beta_k, n)$ of observing $\beta_k$ 1 bits after inserting n items into the buckets i≥k. In particular the probability of observing no 1 bits ($\beta_0 = 0$) in the full filter can be recursively computed by summing the probabilities of hitting the bucket 0 an even number of times 0≤2m≤n with n items (such that the last bucket becomes zero) while observing no 1 bits ($\beta_1 = 0$) for all other buckets with the remaining n−2m items either:

$$P(\beta_0 = 0, n) = \sum_{0 \leq 2m \leq n} P(\beta_1 = 0, n - 2m) \binom{n}{2m} p_0^{2m}(1-p_0)^{n-2m}$$

$$= \sum_{0 \leq 2m \leq n} P(\beta_1 = 0, n - 2m) \binom{n}{2m} (1-\phi)^{2m} \phi^{n-2m}$$

One notable insight is that the geometric XOR filter is self-similar. In other words, inserting n items into the remaining i≥k buckets leads to the same probability distribution of 1 bits $\beta_k$ observed for those i≥k buckets as inserting n items into all buckets:

$$P(\beta_k, n) = P(\beta_0, n)$$

With this equation and the short hands $$B_m^n = \binom{n}{m}(1-\phi)^m \phi^{n-m}$$

and $P(b,n) = P(\beta_k =$, the recurrence equation from above resolves to:

$$P(0, n) = \sum_{0 \leq 2m \leq n} P(0, n - 2m) \binom{n}{2m}(1-\phi)^{2m} \phi^{n-2m}$$

$$= P(0, n)\binom{n}{0}(1-\phi)^0 \phi^n + \sum_{0 < 2m \leq n} P(0, n-2m) B_{2m}^n$$

$$= P(0, n)\phi^n + \sum_{0 < 2m \leq n} P(0, n-2m) B_{2m}^n$$

$$P(0, n)(1 - \phi^n) = \sum_{0 < 2m \leq n} P(0, n-2m) B_{2m}^n$$

$$P(0, n) = \frac{\sum_{0 < 2m \leq n} P(0, n-2m) B_{2m}^n}{1 - \phi^n}$$

The above formula can be extended to any positive number of observed 1 bits $b = \beta_0 > 0$ by also taking the probabilities of hitting the first bucket an odd number of times into account:

$$P(b, n) = \sum_{0 \leq 2m \leq n} P(b, n - 2m) B_{2m}^n + \sum_{0 < 2m \leq n} P(b-1, n - 2m + 1) B_{2m-1}^n$$

$$= P(b, n)\phi^n + \sum_{0 < 2m \leq n} P(b, n - 2m) B_{2m}^n + P(b-1, n - 2m + 1) B_{2m-1}^n$$

$$P(b, n) = \frac{\sum_{0 < 2m \leq n} P(b, n - 2m) B_{2m}^n + P(b-1, n - 2m + 1) B_{2m-1}^n}{1 - \phi^n}$$

Given the joint probabilities P(b, n), the expected number of items $\hat{n}$, that needs to be added to the geometric XOR filter given b observed 1 bits can be estimated with the minimum mean squared error (MMSE) estimator:

$$\hat{n} = E(n \mid b) = \sum_n P(n \mid b)n = \frac{\sum_n P(b, n)n}{\sum_n P(b, n)} = \frac{\sum_n P(b, n)n}{P(b)}$$

where the standard deviation σ of the error is given by:

$$\sigma^2 = E((n - \hat{n})^2 \mid b) = E(n^2 \mid b) - E(n \mid b)^2 = \frac{\sum_n P(b, n)n^2}{P(b)} - \hat{n}^2$$

Since this estimator operates on probabilities conditioned by b, P(b, n) can be a measure and not necessarily a (normalized) probability distribution. Therefore, P(0, 0) can be set to an arbitrary finite number and the remaining values P(b, n) can be computed with the above recursive formulas. In particular, the values P(b, n) can be arranged in a 2-dimensional table, as shown in FIG. 5 by the table with unnormalized joint probabilities 500, with 0≤b≤B many rows and 0≤n≤N many columns where P(0, 0) is initialized to 1 and the remaining values are filled from top left to bottom right. A single value in the n-th column can be computed in O(n) time, such that the whole tableau can be filled in time:

$$\sum_{0 \leq b < B} \sum_{0 \leq n < N} O(n) = \sum_{0 \leq b < B} O(N^2) = O(BN^2)$$

Upscaling

With regard to the upscaling operation mentioned earlier, in order to estimate the size of a set, the 1 bits of the geometric XOR filter are counted. From that count, the original size is determined via a minimum mean square (MMSE) estimator. This operation often does not work well, however, when the number of 1 bits becomes large (e.g., when that number exceeds some threshold).

For instance, the lookup table is expensive to compute. Further, that table is often stored for all potentially occurring number of 1 bits. While in theory there can be infinitely many, in practice this number will be well below 10 k.

The number of items N needed to observe B 1 bits increases exponentially in B. Combined with the quadratic cost $O(N^2B)$ of computing the lookup table, it is not beneficial to compute the lookup table for large B. Additionally, the variance of the observed number of 1 bits increases with the number of observed 1 bits. As a result, the precision of the estimate will decrease when too many bits are taken into account.

The solution to both problems is to count only the B left most 1 bits and remember the right most bit position l just before this limit B would be exceeded, as shown in FIG. 6 by the observing B left-most one bits 600. Since the probability distribution of observing those B left most 1 bits in the hash interval $(0, \phi^l]$ is the same as observing B 1 bits in the full hash interval (0, 1], the embodiments can estimate the number $\hat{n}_B$ of hashed items and its standard deviation $\sigma_B$ to observe B 1 bits in the hash interval $(0, \phi^l]$.

It remains to upscale this estimate to the full hash interval (0, 1] while simply ignoring the remaining set bits. Intuitively, the upscaling should be proportional to the inverse fraction of the covered hash space $$p = \phi^l, \text{ i.e. } \hat{n} \approx \frac{\hat{n}_B}{p}.$$

The remainder of this section derives the exact formulas. The first step is to incorporate the known probabilities for the observed B left-most one bits into the MMSE equation:

$$\hat{n} = \sum_{0 \leq n} nP\left(n \mid B \text{ one bits in range}\left(0, p^l\right]\right)$$

$$= \sum_{0 \leq k \leq n} n \frac{P(k \mid B)\binom{n}{k}p^k(1-p)^{n-k}}{Q}$$

$$= \sum_{0 \leq k, z} (k+z) \frac{P(m \mid B)\binom{k+z}{k}p^k(1-p)^z}{Q}$$

Where $$Q = \sum_{0 \leq k, z} P(k \mid B)\binom{k+z}{k}p^k(1-p)^z$$

is the normalization factor of the joint probability to observe B bits with k items (out of n) falling into the hash interval $(0, p^l]$. The binomial part in these equations can be rewritten as a Negative Binomial Distribution which directly leads to:

$$Q = \sum_{0 \leq k, z} P(k \mid B) \frac{1}{p}\binom{k+z}{k}p^{k+1}(1-p)^z \overset{(2.37)}{=}$$

$$\frac{1}{p} \sum_{0 \leq k, z} P(k \mid B) NB(k, z, p)$$

$$= \frac{1}{p} \sum_{0 \leq k} P(k \mid B) = \frac{1}{p}$$

With this normalization factor and the properties of the Negative Binomial Distribution, a proper upscaling relation can be established confirming the previous intuition:

$$\hat{n} = \sum_{0 \leq k, z} (k+z) P(k \mid B) \binom{k+z}{k} p^{k+1}(1-p)^z$$

$$= \sum_{0 \leq k, z} (k+z) P(k \mid B) NB(k, z, p)$$

$$= \sum_{0 \leq k} P(k \mid B)\left(k + \frac{1-p}{p}(k+1)\right)$$

-continued $$= \sum_{0 \le k} P(k \mid B)\left(\frac{k+1}{p} - 1\right)$$

$$= \frac{\hat{n}_B + 1}{p} - 1 = \frac{\hat{n}_B + 1}{\phi^l} - 1$$

In the same way, the second order moment $\hat{n}^2$ of the upscaled estimate can be derived:

$$\widehat{n^2} = \sum_{0 \le k, z} (k+z)^2 P(k \mid B) NB(k, z, p)$$

$$= \sum_{0 \le k, z} (k^2 + 2kz + z^2) P(k \mid B) NB(k, z, p)$$

$$= \sum_{0 \le k} k^2 P(k \mid B) + \sum_{0 \le k, z} (2kz + z^2) P(k \mid B) NB(k, z, p)$$

$$= \widehat{n_R^2} + \sum_{0 \le k} 2P(k \mid B) \frac{1-p}{p}(k^2 + k) + \sum_{0 \le k, z} z^2 P(k \mid B) NB(k, z, p)$$

$$= \widehat{n_R^2} + 2\frac{1-p}{p}(\widehat{n_R^2} + \widehat{n_R}) + \sum_{0 \le k, z} z^2 P(k \mid B) NB(k, z, p)$$

$$= \widehat{n_R^2} + \frac{1-p}{p}\left(2\widehat{n_R^2} + 3\widehat{n_R} + 1 + \frac{1-p}{p}\widehat{n_R^2} + 3\widehat{n_R} + 2\right)$$

$$\widehat{n^2} = \frac{\widehat{n_R^2}}{p^2} + 3\frac{1-p}{p^2}\widehat{n_R} + \frac{2}{p^2} - \frac{3}{p} + 1$$

Given the closed form solution to these two moments, the actual standard derivation of the upscaled estimate simply becomes:

$$\sigma = \sqrt{\widehat{n^2} + \hat{n}^2} = \frac{\sqrt{\widehat{n_R^2} - \hat{n}_B^2 + (1-p)\hat{n}_B + 1 - p}}{p}$$

$$= \frac{\sqrt{\sigma_B^2 + (1-p)(\hat{n}_B + 1)}}{p}$$

Where $\sigma_B^2 = \hat{n}_B^2 - \hat{n}_B^2$.

The remaining question is how many bits B should be chosen. The brute force approach is to try all possible one bit positions l for a specific geometric filter and pick the one that achieves the best overall standard deviation. A simpler and more practical approach is to determine the optimal B independent of the choice of l. This independence can be found via the relative error margin:

$$err = \frac{\sigma}{\hat{n}} \frac{\sqrt{\sigma_B^2 + (1-p)(\hat{n}_B + 1)}}{\hat{n}_B + 1 - p}$$

$$err \xrightarrow{p \to 0} \frac{\sqrt{\sigma_B^2 + \hat{n}_B + 1}}{\hat{n}_B + 1}$$

This relative error margin can now be computed for every B via the table shown in FIG. 5 and the B which minimizes this error can be chosen once for a given $\phi$. The optimal B approximately aligns with the number of observed 1 bits that are reached before reaching a scenario where bits have a 50:50 chance of being set or unset.

Searching Based on the Geometric XOR Filter

The disclosed embodiments can also be used to perform searching on repositories in an effort to find repositories that are similar in characteristics, such as by having similar elements in a repository. Generally, these searching problems are known as nearest neighbor or similarity search problems. The formal definition of such a search is as follows: given a collection C of n=|C| items and a query item q, find item p*∈C in the collection that is closest to q. In other words, p*=arg $\min_{p \in C}$|p−q|.

This problem becomes especially challenging when the collection increases to millions or billions of items and when items have a large dimensionality. Classical algorithms start suffering from the curse of dimensionality when there are more than 10 dimensions, since the number of dimensions has an exponential influence on either the run-time or space requirements.

Approximate Nearest Neighbor (ANN) makes it possible to reduce the dependency on the dimensionality to a linear factor. Instead of solving the exact nearest neighbor problem, ANN tries to find a p that is at most c times worse than the optimal solution: |p−q|<c|p*−q|.

The disclosed embodiments are beneficially operable even with very high-dimensional items ($d > 10^6$) and potentially billions of them. Often, each item in a collection corresponds to a git-tree which is associated with a specific commit within a repository. Depending on the repository size, such a git-tree represents just a handful of documents or millions of them. The distance metric that measures the similarity between two such git-trees is the symmetric difference of the two trees, i.e. the number of document insertions and deletions. Note, a changed document is treated as a deletion followed by an insertion and move detection is either disabled or also treated as an insertion/deletion pair.

This problem can be restated in terms of set operations as follows. The documents in a git-tree are represented by a set A of (path, content—SHA) tuples where the path includes all the directories names starting from the root node. The distance computation between two git-trees can then be expressed as a symmetric set difference computation |A⊕B|. And a set can be expressed as a Boolean vector $a \in (0, 1)^D$ indicating which tuples in the total tuple universe are present in the set (the size of this tuple universe is $D >> 10^{10}$, for a GitHub platform where each unique document is counted as one dimension). With such vectors a and b, the distance between two commits becomes the Hamming distance which can be expressed in many ways: $|a-b|_2^2 = |a \oplus b|_1$.

The goal is to find for a given commit its approximate nearest neighbor among hundreds of millions other commits in this D-dimensional Hamming space. The empty commit is also part of a commit collection, such that every commit has an upper bound on the nearest neighbor distance which is the number of documents associated with the commit itself.

The geometric XOR filter can be used to solve similarity search over sets.

One primary hurdle with regard to searching over sets is due to the huge dimensionality D aspect. Dimensionality reduction algorithms can optionally be used to solve this problem. The notably property of such algorithms is that they preserve distance computations with some probability.

The geometric XOR filter can also be used to beneficially reduce the dimensionality, but it does it quite differently than all other approaches. First, the disclosed embodiments map from a potentially infinite document universe into another essentially infinite space: the geometric buckets. In practice, the latter is upper bounded by 32 thousand dimensions. As was shown earlier, any set can actually be encoded with just about $-(\log n)/(\log \phi)$ many bits, where $\phi$ is the chosen geometric factor and where n is the set size.

In order to compare two geometric filters, the prefixes of two filters are compared. As soon as the kth difference is found, the mostly random remainder of the filter is discarded and the difference is upscaled by the fraction covered by the prefix. This procedure directly translates into a search problem where the embodiments can then search for items whose prefixes differ in at most k bits assuming the relevant prefix fraction is known. For instance, this prefix fraction can be determined via a binary search over all relevant prefix positions.

The most straight-forward way for indexing k bit differences is by partitioning the geometric buckets of the prefix into 2k non-overlapping super-buckets. The Pigeon Hole Principle reveals that at most k of these super-buckets can differ between the search filter and an indexed candidate. In other words, when searching for the 2k super-buckets of the search filter, a candidate will match at least k of them.

While this procedure will return all relevant candidates with high probability, it has a quite high indexing and query cost. The former is caused by the fact that super-buckets are created for all prefix positions, such that a binary search can determine the correct prefix. While some of these positions can be skipped, since they would either result in too large distances or since the gained precision does not improve towards the end of the binary search, each filter will create super-bucket indices for about $O(\log_2 |a|_2^2)$ many prefix locations.

The query cost can be quite high, since the selectivity of each super-bucket is rather low with this approach. The larger k, the larger the chance that far away candidates will share at least one super-bucket, but then have to be filtered out during the search for k identical super-buckets. Choosing a smaller k will drastically reduce the number of false-positives, but at the same time the chance to miss the best nearest neighbor increases.

The problem with false-positives at serve time can be resolved by creating $\binom{2k}{k}$ super-bucket combinations at indexing time. The cost at indexing time is that every geometric filter will post for each of these super-bucket combinations a posting, i.e. the indexing cost increases from 2k to $\binom{2k}{k}$. In practice, one would partition the geometric filter into s super-buckets and choose super-bucket subsets of size t as a compromise between desired false-negative, false-positive rates and index size.

Prefix Searching

The embodiments are focused on a more efficient derived approach towards similarity search by transforming the problem step-by-step into a prefix search problem. Most similarity search implementations use some kind of bucketing scheme to group similar items with high probability together. To reduce false positives, each item is put into many buckets or alternatively the search space is increased by also visiting neighboring buckets. A bucket is typically created by selecting a random subset of Hamming bits where the size m of the bucket is determined by the targeted radius of the similarity search. The larger the radius the less bits have to be chosen.

This process of selecting bits can also be thought of as permuting bits and just keeping the first m bits of the permutated geometric filters. After applying the same permutation to all n items, a prefix tree can be constructed over the resulting n permutated geometric filters. In this prefix tree, the items of a specific bucket can be found by traversing the first m bits.

The advantage of the prefix tree approach is that one actually does not have to choose m when constructing the prefix tree. Instead, the full geometric filter is permutated and stored in the prefix tree. At query time, m can also be determined dynamically by looking up the longest prefix of the permutated query geometric filter. If a certain bucket size is expected, one can then walk the prefix tree up to find more candidates.

If the prefix tree is stored as van Emde Boas Tree, Hashed Patricia Trie, etc., then the longest prefix can be found in just $O(\log \log D)$ time where D is the size of the geometric filters and the prefix tree can be constructed in $O(Dn)$ time and consumes at most $O(Dn)$ space.

Search With Deficiencies

One potential issue with the described procedure is the use of random permutations that are unhandy to work with in practical applications. Therefore, it is sometimes desirable to look at another bucketing strategy that can be translated into a prefix search with deficiencies problem. As an example, assume that the original geometric filter is already randomly permutated. This assumption is, for instance, satisfied when documents of a repository are hashed to pseudo-random bits. Otherwise, it is possible to always pick a random permutation and apply it to all geometric filters.

It is possible to partition the geometric filter into m equally sized buckets and search for items that differ in at most 0<k<m bits with the query geometric filter. In other words, the idea is to find all the items that have at least m−k many buckets with the query geometric filter in common. One approach to actually find those items is to index all the $\binom{m}{m-k}=\binom{m}{k}$ bucket combinations for every item. With such an index, the candidates can be found by looking up the $\binom{m}{k}$ bucket combinations corresponding to the query geometric filter. As stated previously, m and k depend on the search radius and the desired false positive and false negative probabilities.

This scheme is quite efficient, when $\binom{m}{k}$ is small which implies that k and m are small. But if the search radius should be increased, then also the number of deficiencies k increases. One way to address this problem is to down-sample the geometric filter, i.e. instead of looking for 2k deficiencies in the full geometric filter, it is possible to just look for k deficiencies in the first half of the geometric filter. That way, the search radius doubled without changing $\binom{m}{k}$. For a full nearest neighbor index, $O(\log D)$ such indices would be created.

This procedure can be transformed into a prefix search problem by revisiting the bucket partitioning procedure. Instead of picking D/m consecutive bits, it is possible to pick every m-th bit to create these buckets where the i-th bucket starts at the i-th bit. Note, that the performance of the algorithm will not change since a random bit ordering was assumed. Combining k such buckets can be thought of as picking a bit mask of size m with exactly k bits being set. This bit mask can then be repeated D/m times to cover the full original geometric filter. AND-ing this repeated bit mask with the original geometric filter leads to some masked geometric filter and this masked geometric filter could be used as lookup key for the corresponding bucket combination in the original hash based scheme.

One beneficial property of these masked geometric filters is that down-sampling is equivalent to simply truncating the masked geometric filter at a certain point. This means that each prefix tree over all masked geometric filters for a specific mask is equivalent to the hash based index for the corresponding bucket combination but across all scales. If the masked geometric filters are explicitly stored in the prefix tree, then the memory consumption of the prefix tree is at most $$O\left(n\frac{D}{m}\right)$$

versus O(n log D) for the hash based approach.

Longest Prefix Search with Deficiencies

The problem that was just solved is actually the longest prefix search with deficiencies. A brute-force solution would store the original data in a prefix tree and then traverse the tree for a given query geometric filter. But, instead of following only the edges that result in exact prefix matches, the traversal follows all edges that lead to at most k bit differences. As soon as k differences have been found, the traversal traces back.

The problem with this brute force solution is to predict whether it is worth following a specific branch or not. This problem becomes harder the larger the geometric filters become and the more deficiencies are allowed. The prefix trees with masking from the previous discussion solve the problem elegantly by providing a kind of look-ahead. While each masked prefix tree may find candidates that differ by more than k bits, all the $\binom{m}{k}$ masked prefix trees together guarantee that the longest prefix will be found that differs by at most k bits.

It is worthwhile to note that each of these $\binom{m}{k}$ masked prefix searches can be performed in O(log D) time with the appropriate prefix data structures, since these are just longest common prefix searches without deficiencies.

If only an approximate solution to the problem is required, then the search can be further sped up by processing the most promising candidates first and not evaluating all candidates. Candidates that share a longer common prefix with one of the masked geometric filters are more promising than those with shorter common prefix. This simple strategy can bound the search cost while finding high quality results.

Prefix Search With Geometric Filters

The space requirements of the prefix search solution scales linearly with the number of dimensions D whereas the standard approach scales logarithmically in D. Using geometric filters, however, instead of D-dimensional geometric filters reduces the space requirement to at most O(n log D).

In practice, the embodiments can directly flip bits in the geometric filter instead of taking the detour through a large D-dimensional vector, or a sparse representation of it. As a side effect, the memory consumption will also be bound by O(log D) for each item.

An example will be helpful. This example uses the masking approach that was described earlier in this document. Suppose the geometric XOR filter was previously implemented and generated an index having the following values:

Index: 0000 1010 1101 0010 0101 1010 0111 0000 1100

Further suppose that a query is generated to search for a repository having elements that are similar to the elements defined in the query. The query elements have the following values:

Query: 0000 1010 1111 0001 0101 1010 0111 0000 1100

A comparison of the index and the query will show that there are three bits that are different, as reflected below by the bolded and underlined bits.

Index: 0000 1010 11<u>0</u>1 00<u>1</u>0 0101 1010 0111 0000 1100
Query: 0000 1010 11<u>1</u>1 00<u>0</u>1 0101 1010 0111 0000 1100

The embodiments are configured to perform an XOR operation between the query values and the index values (i.e. a list of bit positions) to thereby generate a resulting bit mask, which reveals which bits are different between the two sets of bits. The resulting XOR'ed bit values are as follows, and the differences are bolded and underlined.

XOR'ed: 0000 0000 00<u>1</u>0 00<u>11</u> 0000 0000 0000 0000 0000

The embodiments search for a longest prefix that exists until a threshold number of differences (reflected by the 1 bits) are found. In some instances, this threshold number is set to a value of 2. Thus, the embodiments search for a longest prefix until two total 1 bits are found. With reference to the query values above, as reflected below, the identified prefix would thus be as indicated by the underlined bits.

Identified Prefix (Based On Query Values): <u>0000 1010 1111 0001</u> 0101 1010 0111 0000 1100

Recall, within the section underlined above, there are only two bits that were actually changed, and those bits are bolded. The other bits cancel each other out because those bits in the query match those same bits in the index. What this means, then, is that the embodiments can thereafter upscale starting after the position of the second bit that was identified as being different to the rest of the range. Notably, the longer the prefix is, the more similar the query is to the index.

In some cases, the embodiments are configured to estimate the length of the prefix, thereby also estimating the level of difference that exits between the query and the index to thereafter determine the upscaling. In some cases, the embodiments first split the query based on the estimated length. For instance, supposing that the estimation were set to 20 (this is an example value only and should not be viewed as binding; notably, for different numbers, it is expected to find the k discrepancies within a prefix of certain length), then the query is split in the following manner:

Geometric Filter (Based on Query): 0000 1010 1111 0001 0101 1010 0111 0000 1100

Now, the embodiments are tasked with finding the threshold number of differences (e.g., perhaps two). To do so, the embodiments group the bits into blocks of a certain length (e.g., perhaps blocks of length 5) and discard the remaining bits, as shown below.

Geometric Filter: 00001 01011 11000 10101

To find two discrepancies, the embodiments are tasked with finding two blocks from the above geometric filter that are identical to the index. The other two blocks will then include the discrepancies. The blocks will have at least one discrepancy, though they can have more. Notably, the likelihood or chance that a block will have more than one discrepancy will decrease as the number of blocks increases (e.g., as the length of each block is set to smaller values).

The search task then becomes a task of looking for repositories that have at least two of these blocks that are identical. In practical terms, this task simplifies to a logical AND operation between the search index and the query.

Now, consider the scenario where the initial estimation (e.g., previously, it was set to 20) was chosen wrongly. In the scenario where the initial estimation is too high (i.e. overestimated the prefix length), then the result is that the embodiments find too few candidates. In the scenario where the initial estimation is too low (i.e. underestimated the prefix length), then the result is that the embodiments find too many candidates.

To compensate for such scenarios, the embodiments can perform a binary search using the estimated prefix length value. Notably, this prefix length has a size of log(log(N)) as the maximum, where N is the size of the set/repository. Further, the range of this prefix value will be from 0 . . . log(log(N)). In any event, the number of binary searches that will be performed is a rather small number. As a result, performing this estimation will not be a compute intensive operation. In some cases, the embodiments start with the value for the full range (e.g., log(log(N)) and then work downward in making the estimation.

The above example focused on a scenario where the block sizes were chosen to be uniform. Further optimizations can be performed, however, in order to make the index search operation more efficient.

Instead of performing the partitioning operation described above, some embodiments are configured to perform a different index operation based on different patterns, as reflected below. Below is the geometric filter that was originally partitioned into four blocks, each having a length of 5.

Geometric Filter: 00001 01011 11000 10101

Instead of performing this partitioning, some embodiments operate based on the patterns, as shown below, which is based on the geometric filters from above.

0xxx1xxx1xxx0xxx0xxx
x0xxx0xxx1xxx0xxx1xx
xx0xxx1xxx1xxx0xxx0x
xxx0xxx0xxx1xxx1xxx1

The embodiments then index the following patterns:
Index: {"0", "01", "011", "0110", "01100"}
Index: {"0", "00", "001", "0010", "00101"}
Index: {"0", "01", "011", "0110", "01100"}
Index: {"0", "00", "001", "0011", "00111"}

Here, the embodiments are obtaining all of the prefixes after dropping off the remaining bits. When the embodiments estimate the prefix length, the query is processed in the same way (e.g., cutting it off based on the estimated prefix length) and then split that query into the various prefix chunks, as performed above for the index. Now, based on the estimated length of the prefix, the embodiments can select whichever chunk to use to perform the comparison.

As an example, supposing the estimated prefix length was selected as 20 bits, the patterns having 5 bits will be used during the searching process. On the other hand, if the estimated length was selected as 12 bits, the patterns having 3 bits will be used during the searching process. Because these patterns of buckets are now very similar to one another, that similarity allows those buckets of bits to be indexed in a faster and easier manner. In addition to increased indexing speed, the embodiments can also optionally generate a prefix sharing dictionary comprising the different patterns so that storing random patterns of bits can potentially be avoided.

Additional Usage Scenarios

The disclosed principles can be used in various other scenarios beyond just a Git repository scenario. As one example, the principles can be practiced in a blob storage compression scenario. In this scenario, the described "set" can correspond to a single document, which consists of a certain number of bytes. Using the disclosed principles, the bytes can now be extracted, and sequences of those bytes can be put into a set. This set can include any number of sub chunks, and those chunks can be indexed or represented using the data structure generated using the disclosed geometric XOR filter. These chunks can then be indexed, and similar blocks or similar documents can be searched for within this index using the techniques described herein.

Another scenario where the principles can be practiced is in a web or Internet based scenario. In particular, the disclosed principles can be practiced against web-based documents. Any type of nearest neighbor searching problem in the Hamming space can also be benefitted using the disclosed principles. Scenarios where it is desirable to search for near duplicates or perhaps even exact duplicates can also be benefitted by practicing the disclosed principles.

Data compression can also be performed by the disclosed embodiments. That is, the embodiments are able to represent a repository in a highly compact manner. Using the disclosed compaction processes (e.g., representing a repository or data set as a geometric filter), the embodiments are able to find similar repositories and index the delta or differences between those repositories. Such processes can be viewed as being a form of compression (as well as blob storage compression).

Sorting

There are many ways to store prefix trees with different space and lookup tradeoffs. So far, an assumption has been made regarding the data structures. In particular, the data structures achieve optimal lookup times at the cost of a potentially larger space footprint. Other extremes can be considered, however, such as by trying to minimize space requirements at the cost of lookup performance and assuming geometric filters with O(log D) many bits.

Sorting geometric filters lexicographically is another way to represent prefix trees. With this representation, it is possible to save space by referencing the original geometric filters instead of copying their data. This way, each prefix tree can be stored with just O(n) space.

Without additional information, a lookup could then be realized as a binary search in O(log n) time. There is also a hidden factor in this binary search which compares log D bits in order to decide whether the middle item of the binary search is smaller or bigger than the query vector. It is possible to get rid of this factor by remembering the common prefix for the search interval and by skipping that common prefix during the comparison of middle items. With this recognition, the overall complexity is just O(log n+log D). Notably, that same recognition can be used to sort the items faster.

If n is much larger than D, then it is possible to reduce the lookup time further by representing the underlying prefix tree structure in a Succinct Bitrank data structure, which can then be used to traverse the prefix tree in O(log D) time.

Minimum Spanning Tree

Figure 8:
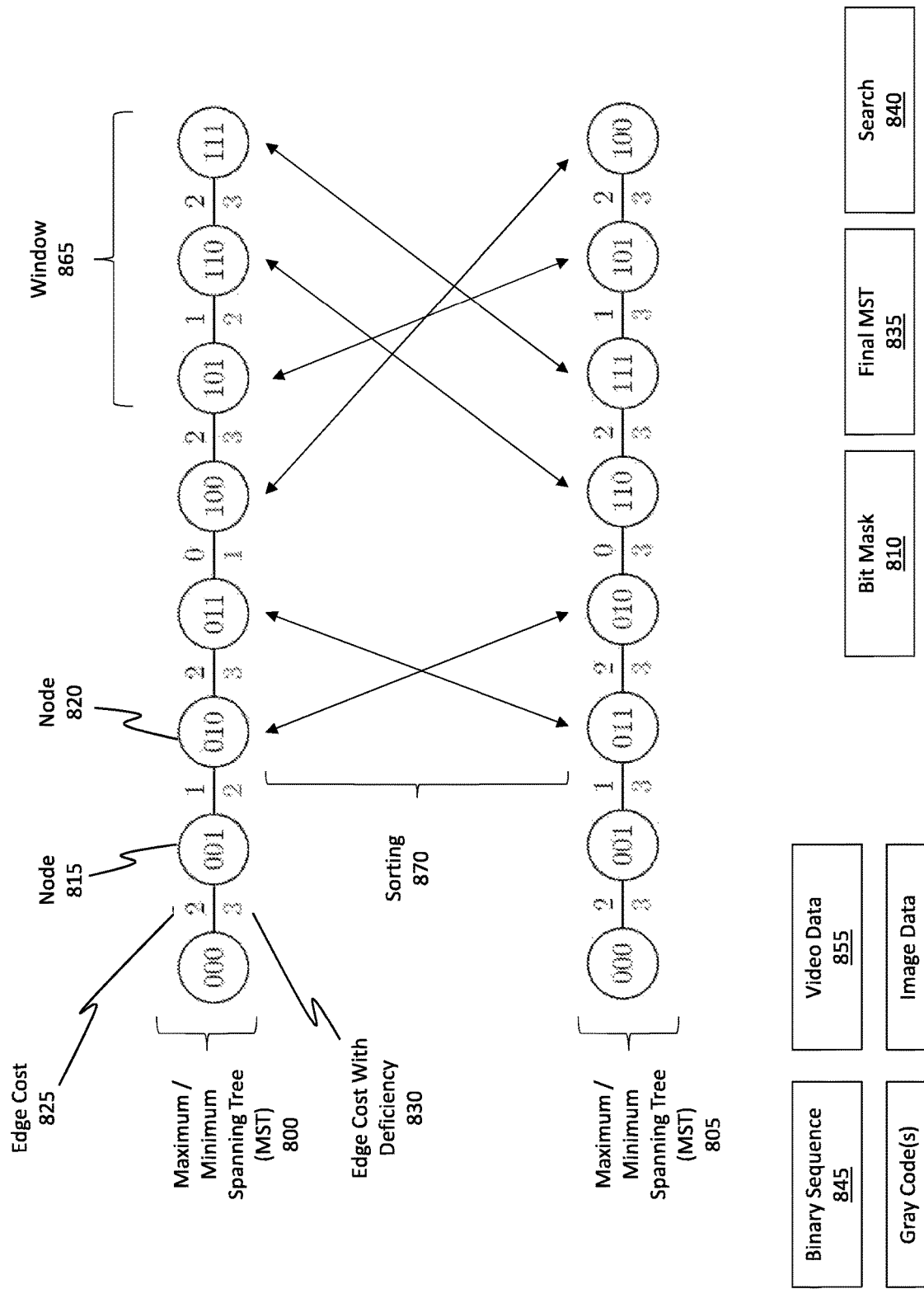
FIG. 8 shows various examples of minimum spanning trees (MSTs).

Attention will now be directed to FIGS. 7 and 8. Initially, a high level overview of some of the functionalities and features of the embodiments will be presented. Subsequently, an in-depth discussion will be provided.

Accordingly, FIG. 7 illustrates a flowchart of an example method 700 for efficiently generating an approximate minimum spanning tree (MST) to enable a search to be performed through high-dimensional data sets to identify data sets that are similar to one another. As a result of using the MSTs, rapid searching can be performed even across the high-dimensional data sets. Method 700 can be performed within the architecture 100 of FIG. 1. Further, method 700 can be performed by the geometric filter engine 105. Notably, the search operation does not necessarily need the MST itself; rather, the search operation can rely on the sorted vectors of the masked geometric filters. For a given query geometric filter, it is possible to do a binary search in all of these vectors to find the nearest geometric filters in the masked space. The actual nearest neighbors are computed from those candidates by computing the actual difference between the unmasked geometric filters.

Act 705 includes accessing a plurality of data sets. For instance, the data set(s) 120 and 135 from FIG. 1 can be accessed.

For each data set, act 710 includes generating a corresponding geometric filter (e.g., the geometric filters illustrated in FIG. 3B). As a result, multiple geometric filters are generated. Notably, each geometric filter comprises a corresponding bit sequence.

Act 715 includes generating an approximate MST for each mask over the plurality of data sets (such that MSTs are generated for the plurality of data sets) by performing, for a plurality of iterations, a number of operations, as shown by acts 720, 725, and 730. Optionally, the number of iterations include two or potentially more than two iterations, but at least two iterations.

Act 720 includes using, for each iteration, a new bit mask to project the geometric filters from a first dimensional space to a second, lower dimensional space. As a result of this projection, multiple masked bit sequences are generated from the geometric filters. The new bit mask is selected to ensure that a selected number of discrepancies between the geometric filters plurality are compensated for.

Act 725 includes sorting the masked bit sequences (masked geometric filters) based on a defined sorting order. The sorted, masked bit sequences are represented as nodes with a corresponding edge disposed between any two nodes. As a result of this sorting, nodes that are identified as being most common relative to one another are placed as neighboring nodes and are linked with a particular edge.

For each respective pair of neighboring nodes, act 730 includes calculating a corresponding edge cost based on a corresponding symmetric difference estimation that exists between two corresponding geometric filters. As a result, multiple edge costs are calculated. The first neighboring node is associated with a first geometric filter, and the second neighboring node is associated with a second geometric filter. A geometric filter difference between the first geometric filter and the second geometric filter is linked with a particular edge that connects the first neighboring node with the second neighboring node. A combination of the nodes and edges constitute a respective MST that was generated for the new bit mask.

As mentioned previously, calculating the corresponding edge cost based on the corresponding symmetric difference estimation between two corresponding geometric filters can include discarding remaining bits after a k-th difference is found between the first and second bit sequences.

Act 735 includes merging multiple approximate MSTs, which were generated for each bit mask used during each iteration, together to generate a final MST for each respective data set.

An additional act (not illustrated) includes facilitating a search of the data sets using one or more of the final MSTs that were generated.

FIG. 8 shows a useful illustration showing the difference between lexicographical sorting and sorting by Gray codes for a single mask. FIG. 8 shows an MST 800 and an MST 805, each of which can optionally be generated using a different bit mask 810. MST 800 is shown as include a node 815 and a node 820, both of which comprise a sequence of bits as described above. In accordance with the disclosed principles, an edge cost 825 is computed between these two nodes. Similarly, an edge cost with a deficiency 830 can also be computed. Further details on these aspects will be provided in the sections listed below. As described above, various MSTs can be merged, combined, or folded into one another to form a final MST 835, which can then be used to facilitate at search 840 across data sets.

In some cases, the nodes can be sorted based on a defined sorting order. For instance, the sorting order can optionally be based on a binary sequence 845. In some cases, the sorting order can optionally be based on gray code(s) 850.

Optionally, the different data sets can include video data 855, and the search using the final MSTs can be performed on the video data 855. In some cases, the data sets include image data 860, and the search using the final MST(s) is performed on the image data 860. Notably, any of the disclosed principles can be applied to any of these different types of datasets.

In some cases, the second, lower dimensional space mentioned earlier is a one dimensional space. Optionally, the second, lower dimensional space can be one dimensional space or two dimensional space.

In some cases, a window 865 can be defined. Here, the window 865 comprises three or more nodes. Edge costs as between these three or more nodes can be generated. As a result, it is not strictly the case that only direct neighboring nodes are compared to determine edge costs. Instead, nodes within a defined interval or window can also be compared. Further details on all of these aspects will now be presented below.

Accordingly, one application for similarity searching is the construction of a similarity tree, or more precisely an Euclidean Minimum Spanning Tree (MST). In this scenario, every node has an edge to every other node and thus standard MST algorithms require at least $O(n^2)$ time, which becomes infeasible for large n. Since the similarity measure is a Euclidean metric, it is desirable to do better. For instance, the approximation of the MST can be achieved via spanner graphs that can be computed in $O(n \log n)$ time. Other clustering based ideas can be used to directly compute an approximate MST. Another approach is based on Boruvka's Algorithm combined with Nearest Neighbor Search. That is, it is possible to execute $O(n)$ many nearest neighbor searches in each of the $O(\log n)$ Boruvka rounds, which then immediately leads to an $O(n \log n)$ algorithm. The downside of this approach is the large hidden constant of each individual nearest neighbor search and the required index updates whenever the algorithm moves from one connected component to the next.

The disclosed embodiments are focused on a different strategy that computes an approximate MST more directly without building a complete nearest neighbor index. The basic insight is that the MST of a 1-dimensional metric is trivial to compute.

1D Euclidean MST

Sorting points by their 1D value corresponds to an MST where each point is connected to its left and right neighbor in the sorted representation. This can be easily seen as follows. The cost of the tree that was constructed equals the difference between largest and smallest points. Since any MST must connect these two extreme points, it cannot have a lower cost. And thus the sorted ordering is an optimal MST.

Approximate MST Via Random Projections

Suppose a high-dimensional point set has n points. This high-dimensional point set can be reduced to a 1-dimensional point set with a random projection. The resulting MST approximates the MST of the original point set.

The quality of the approximation is mostly determined by the false positives, i.e. points that are far away in the original space, but get very close in the projected space. Points within a dense cluster are less affected by this problem, since the false positive ratio shrinks linearly with the cluster size.

Since sorting data points takes O(n log n) time, it is possible to also project into a 2-dimensional space where the optimal MST can be computed with a Delaunay Triangulation. Such computation is also in O(n log n) time.

In general, the precision of this procedure can be improved by repeating it k times. The n−1 edges of each run are collected into one connected graph which has in the end at most k(n−1) edges (there might be less due to duplicates). On this graph, any standard MST algorithm can be run to retrieve a better approximation. Since the number of edges in this graph is linear to the number of nodes, such an MST can be computed in O(kn) time.

Parallelizing Merging of Approximate MST (AMST)

The straight-forward implementation collects all the edges from the k individual approximate MSTs (AMSTs) and then constructs a new AMST from the super-set of edges. The downside of this approach is that parallelizing MST construction is non-trivial.

An alternative approach is taking advantage of the fact that merging of AMSTs corresponds to a fold operation, i.e. merging of AMSTs always takes AMSTs as input and outputs exactly one AMST. Furthermore, the order in which these fold steps are applied will not change the cost of the final AMST. One option is to group the original AMSTs into $\sqrt{k}$ many sets of size $\sqrt{k}$ and process them in parallel. After one such round, $\sqrt{k}$ many AMSTs are left, which can then be processed in one final second round. The total run-time of this approach is at most twice the time of the fastest possible parallel MST algorithm.

One potential implementation of the fold is based on Kruskal's algorithm. The expensive sorting of edges can be replaced with a faster k-merge procedure as follows. Each AMST is represented by its edges sorted by their increasing weight. The k sorted sequences are k-merged into one sorted stream of edges. That stream feeds into a disjoining-set data structure to extract the minimum spanning tree (i.e. edges which would lead to a cycle are skipped). The output is again a sorted list of edges comprising the folded AMST.

Approximate MST for Longest Common Prefix

Similar to the 1D Euclidean Minimum Spanning Tree, a lexicographically sorted array of sequences corresponds to a maximum spanning tree which maximizes the longest common prefixes. It is possible to do better though.

Consider the following binary sequences: 000, 001, 010, 011, 100, 101, 110, 111. These sequences are already lexicographically ordered, thereby resulting in the maximum spanning tree 800 of FIG. 8, showing a total common prefix length of 10. For instance, with a bit value of 000 and a bit value of 001, two bits are similar (e.g., the first two zeros). With a bit value of 001 and a bit value of 010, only one bit is similar. With a bit value of 010 and a bit value of 011, two bits are similar. Thus, the numbers above the edge lines represent the number of similar bits between two nodes. The prefix length of 10 is obtained by adding the values above the edge lines (e.g., 2+1+2+0+2+1+2). Another possible solution with the same cost is shown by the maximum spanning tree 805.

The difference between the maximum spanning tree 800 and the maximum spanning tree 805 becomes clear when computing the longest common prefix with 1 deficiency for both trees (shown as bottom labels underneath each edge). To be clear, the numbers below the edge lines correspond to the longest common prefix with one deficiency computed between the neighboring nodes. To illustrate, with the bit values 000 and 001 and with one deficiency allowed, the number of common bits between those two values is two (e.g., the first two zeros are common), and one deficiency is allowed, thereby resulting in the "3" value indicated below the edge line. With a bit value of 001 and a bit value of 010 and with one deficiency allowed, the number 2 is generated. With a bit value of 010 and 011 and with one allowed deficiency, the number 3 is generated.

Accordingly, as shown by the values underneath the edge lines, the maximum spanning tree 800 now has a cost of 17 (e.g., 3+2+3+1+3+2+3) whereas the cost of the maximum spanning tree 805 is 21 (e.g., 3+3+3+3+3+3+3) which is significantly better (in this context, the higher number reflects a better performance). Notice, the different sorting 870 for the maximum spanning tree 805 as compared to the maximum spanning tree 800.

The reason why the maximum spanning tree 800 performs worse when looking beyond the first differing bit is that the lexicographical sorting process puts the potentially worst sequences next to each other. The maximum spanning tree 805 fixes that by interpreting the bit sequences as gray codes and sorting sequences by the rank of the corresponding gray code. A gray code refers to an ordering technique for the binary numeral system where two successive binary values differ by only one binary digit. The table shown below illustrates the differences between traditional binary and the gray codes.

TABLE

Showing Binary Versus Gray Codes

| Decimal | Binary | Gray |
|---|---|---|
| 0 | 0000 | 0000 |
| 1 | 0001 | 0001 |
| 2 | 0010 | 0011 |
| 3 | 0011 | 0010 |
| 4 | 0100 | 0110 |
| 5 | 0101 | 0111 |

Now, two neighboring gray codes differ by construction in just one bit. In practice, not all gray codes will occur in the input set so that more than just one bit will differ. But, using the rank of gray codes will move sequences next to each other that share the more bits after the first deficiency. Worthwhile to note, the longest common prefix with one deficiency does not define a total ordering and thus is typically not directly usable for sorting. It is also worthwhile to note that the more deficiencies that can be incorporated into the sorting, the more precise the resulting estimates will become due to the properties of the geometric filter.

The straight-forward implementation of this idea is to apply the GrayToBinary operation on each bit sequence. Then, sort those binary sequences lexicographically, and finally transform them back with the BinaryToGray operation.

A faster solution takes advantage of the fact that the GrayToBinary operation essentially flips every bit by the number of one bits up to that position. Thus, when comparing two bit sequences, we can simply determine the position at which the two sequences differ. Both sequences have now the same number of leading one bits up to that position, i.e. the sequence with the 1 in the differing position is larger if and only if it is preceded by an even number of 1 bits.

Worthwhile to note, in the gray code representation, any code can be treated as a starting position. In other words, the sorted sequence represents a loop instead of a chain. It is possible to break the loop by removing one edge from the loop (ideally the largest one).

Approximate MST for Longest Common Prefix with Deficiencies

It is possible to use masking to approximate a longest prefix search with deficiencies, i.e. by picking the right set of masks, it is possible to ensure that the first k deficiencies between the query sequence and the nearest neighbor disappear. Translating this thought into the MST construction with longest common prefixes means that it is possible to put two sequences next to each other that share at least a masked prefix of the same length as the nearest neighbor. It is, however, not guaranteed that the nearest neighbors actually end up next to each other, since by chance outliers may share a longer prefix. The chance of those outliers being interspersed between the true nearest neighbors can be controlled by the mask size and the number of deficiencies.

Increasing the mask size and therewith the number of deficiencies becomes quickly infeasible. Instead, it is possible to take advantage of the fact that the true nearest neighbor must be close by in at least one of the masked representations. Instead of comparing each sequence only with its left and right neighbors, it is possible to compare each sequence with w many neighbors. Notably, it is often sufficient to only compare to one side, since the other side is implicitly covered by previous sequences.

Since the task was not just to find the nearest neighbors, but to construct an actual MST, it is typically not sufficient to just pick the nearest neighbor for each node from the neighborhood. Instead, all the w edges can be added to the temporary graph from which an approximate MST will be constructed afterwards. Otherwise, the graph might not be connected which would result in a worse approximation. Accordingly, it is possible to use gray codes to move more similar sequences next to each other. Another approach is to traverse the prefix tree to connect sequences which maximize the LCP with 1 deficiency.

Example Computer/Computer Systems

Figure 9:
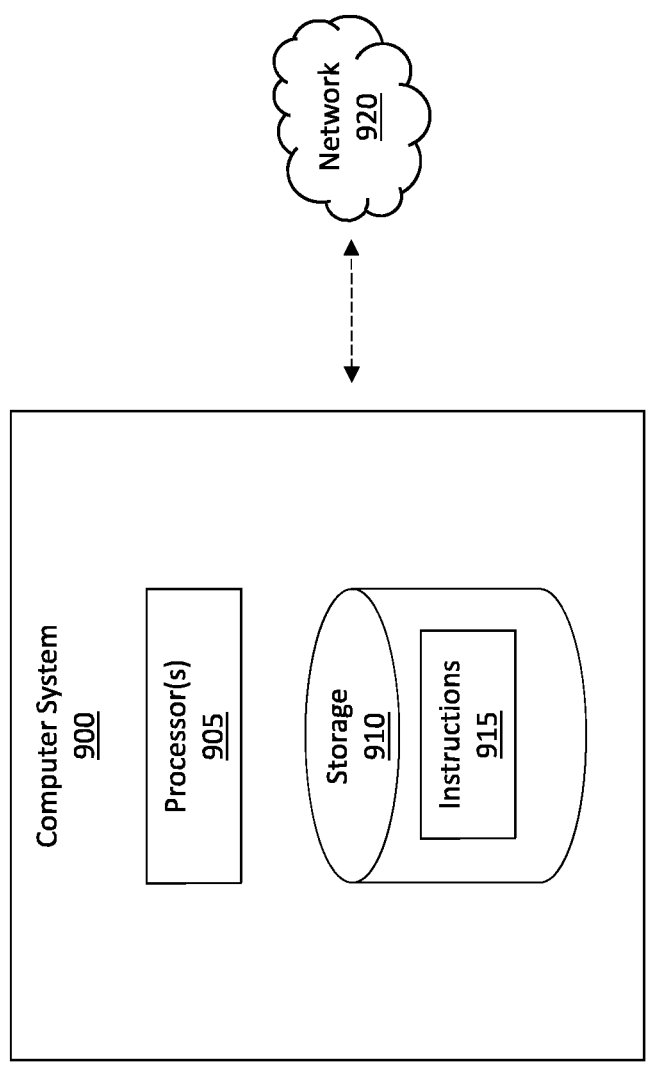
FIG. 9 illustrates an example computer system configured to perform any of the disclosed operations.

Attention will now be directed to FIG. 9 which illustrates an example computer system 900 that may include and/or be used to perform any of the operations described herein. For instance, computer system can be configured to perform the methods 200 and 300 from FIGS. 2A and 3A, respectively.

Computer system 900 may take various different forms. For example, computer system 900 may be embodied as a tablet, a desktop, a laptop, a mobile device, or a standalone device, such as those described throughout this disclosure. Computer system 900 may also be a distributed system that includes one or more connected computing components/devices that are in communication with computer system 900.

In its most basic configuration, computer system 900 includes various different components. FIG. 9 shows that computer system 900 includes one or more processor(s) 905 (aka a "hardware processing unit") and storage 910.

Regarding the processor(s) 905, it will be appreciated that the functionality described herein can be performed, at least in part, by one or more hardware logic components (e.g., the processor(s) 905). For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

As used herein, the terms "executable module," "executable component," "component," "module," or "engine" can refer to hardware processing units or to software objects, routines, or methods that may be executed on computer system 900. The different components, modules, engines, and services described herein may be implemented as objects or processors that execute on computer system 900 (e.g. as separate threads).

Storage 910 may be physical system memory, which may be volatile, non-volatile, or some combination of the two. The term "memory" may also be used herein to refer to non-volatile mass storage such as physical storage media. If computer system 900 is distributed, the processing, memory, and/or storage capability may be distributed as well.

Storage 910 is shown as including executable instructions 915. The executable instructions 915 represent instructions that are executable by the processor(s) 905 of computer system 900 to perform the disclosed operations, such as those described in the various methods.

The disclosed embodiments may comprise or utilize a special-purpose or general-purpose computer including computer hardware, such as, for example, one or more processors (such as processor(s) 905) and system memory (such as storage 910), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Furthermore, computer-readable storage media, which includes physical computer storage media and hardware storage devices, exclude signals, carrier waves, and propagating signals. On the other hand, computer-readable media that carry computer-executable instructions are "transmission media" and include signals, carrier waves, and propagating signals. Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 900 may also be connected (via a wired or wireless connection) to external sensors (e.g., one or more remote cameras) or devices via a network 920. For example, computer system 900 can communicate with any number devices or cloud services to obtain or process data. In some cases, network 920 may itself be a cloud network. Furthermore, computer system 900 may also be connected through one or more wired or wireless networks to remote/separate computer systems(s) that are configured to perform any of the processing described with regard to computer system 900.

A "network," like network 920, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 900 will include one or more communication channels that are used to communicate with the network 920. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within the scope.

What is claimed is:

1. A method for efficiently generating an approximate minimum spanning tree (MST) to enable a search to be performed through high-dimensional data sets to identify data sets that are similar to one another, where use of the MST enables rapid searching to be performed even across the high-dimensional data sets, said method comprising:
   accessing a plurality of data sets;
   for each data set in the plurality, generating a corresponding geometric filter such that a plurality of geometric filters are generated, wherein each geometric filter in the plurality comprises a corresponding bit sequence;
   generating an approximate MST for each mask over the plurality of data sets by performing, for a plurality of iterations, the following operations:
      using, for each iteration, a new bit mask to project the plurality of geometric filters from a first dimensional space to a second, lower dimensional space, wherein as a result of said projecting, a plurality of masked bit sequences are generated from the plurality of geometric filters, wherein the new bit mask is selected to ensure that a selected number of discrepancies between the geometric filters in the plurality are compensated for;
      sorting the plurality of masked bit sequences based on a defined sorting order, wherein the plurality of sorted, masked bit sequences are represented as nodes with a corresponding edge disposed between any two nodes, and wherein, as a result of said sorting, nodes that are identified as being most common relative to one another are placed as neighboring nodes and are linked with a particular edge;
      for each respective pair of neighboring nodes, calculating a corresponding edge cost based on a corresponding symmetric difference estimation that exists between two corresponding geometric filters, wherein the first neighboring node is associated with a first geometric filter, and the second neighboring node is associated with a second geometric filter, wherein a geometric filter difference between the first geometric filter and the second geometric filter is linked with a particular edge that connects the first neighboring node with the second neighboring node, and wherein a combination of the nodes and edges constitute a respective MST that was generated for said new bit mask; and merging multiple approximate MSTs, which were generated for each bit mask used during each iteration, together to generate a final MST.

2. The method of claim 1, wherein the defined sorting order is based on a binary sequence.

3. The method of claim 1, wherein the defined sorting order is based on Gray codes.

4. The method of claim 1, wherein a size of one or more data sets in the plurality exceeds $10^6$ elements.

5. The method of claim 1, wherein the plurality of data sets includes video data, and wherein a search using the one or more final MSTs is performed to search through the video data.

6. The method of claim 1, wherein the plurality of data sets are included in a repository.

7. The method of claim 1, wherein the second, lower dimensional space is a one dimensional space.

8. A computer system configured to efficiently generate an approximate minimum spanning tree (MST) to enable a search to be performed through high-dimensional data sets to identify data sets that are similar to one another, where use of the MST enables rapid searching to be performed even across the high-dimensional data sets, said computer system comprising:
one or more processors; and
one or more hardware storage devices that store instructions that are executable by the one or more processors to cause the computer system to:
access a plurality of data sets;
for each data set in the plurality, generate a corresponding geometric filter such that a plurality of geometric filters are generated, wherein each geometric filter in the plurality comprises a corresponding bit sequence;
generate an approximate MST for each mask over the plurality of data sets by performing, for a plurality of iterations, the following operations:
use, for each iteration, a new bit mask to project the plurality of geometric filters from a first dimensional space to a second, lower dimensional space, wherein as a result of said projecting, a plurality of masked bit sequences are generated from the plurality of geometric filters, wherein the new bit mask is selected to ensure that a selected number of discrepancies between the geometric filters in the plurality are compensated for;
sort the plurality of masked bit sequences based on a defined sorting order, wherein the plurality of sorted, masked bit sequences are represented as nodes with a corresponding edge disposed between any two nodes, and wherein, as a result of said sorting, nodes that are identified as being most common relative to one another are placed as neighboring nodes and are linked with a particular edge;
for each respective pair of neighboring nodes, calculate a corresponding edge cost based on a corresponding symmetric difference estimation that exists between two corresponding geometric filters, wherein the first neighboring node is associated with a first geometric filter, and the second neighboring node is associated with a second geometric filter, wherein a geometric filter difference between the first geometric filter and the second geometric filter is linked with a particular edge that connects the first neighboring node with the second neighboring node, and wherein a combination of the nodes and edges constitute a respective MST that was generated for said new bit mask; and
merge multiple approximate MSTs, which were generated for each bit mask used during each iteration, together to generate a final MST.

9. The computer system of claim 8, wherein the plurality of data sets includes image data, and wherein a search is performed using the final MSTs to search through the image data.

10. The computer system of claim 8, wherein the second, lower dimensional space is a one dimensional space or a two dimensional space.

11. The computer system of claim 8, wherein the defined sorting order is based on one of a binary sequence or a Gray code.

12. The computer system of claim 8, wherein the plurality of data sets includes video data, and wherein a search using the one or more final MSTs is performed to search through the video data.

13. The computer system of claim 8, wherein calculating the corresponding edge cost based on the corresponding longest common prefix includes discarding remaining bits after a k-th difference is found between the first and second bit sequences.

14. The computer system of claim 8, wherein the plurality of iterations includes two iterations.

15. One or more hardware storage devices that store instructions that are executable by one or more processors of a computer system to cause the computer system to:
access a plurality of data sets;
for each data set in the plurality, generate a corresponding geometric filter such that a plurality of geometric filters are generated, wherein each geometric filter in the plurality comprises a corresponding bit sequence;
generate an approximate MST for each mask over the plurality of data sets by performing, for a plurality of iterations, the following operations:
use, for each iteration, a new bit mask to project the plurality of geometric filters from a first dimensional space to a second, lower dimensional space, wherein as a result of said projecting, a plurality of masked bit sequences are generated from the plurality of geometric filters, wherein the new bit mask is selected to ensure that a selected number of discrepancies between the geometric filters in the plurality are compensated for;
sort the plurality of masked bit sequences based on a defined sorting order, wherein the plurality of sorted, masked bit sequences are represented as nodes with a corresponding edge disposed between any two nodes, and wherein, as a result of said sorting, nodes that are identified as being most common relative to one another are placed as neighboring nodes and are linked with a particular edge;
for each respective pair of neighboring nodes, calculate a corresponding edge cost based on a corresponding symmetric difference estimation that exists between two corresponding geometric filters, wherein the first neighboring node is associated with a first geometric filter, and the second neighboring node is associated with a second geometric filter, wherein a geometric filter difference between the first geometric filter and the second geometric filter is linked with a particular edge that connects the first neighboring node with the second neighboring node, and wherein a combination of the nodes and edges constitute a respective MST that was generated for said new bit mask; and merge multiple approximate MSTs, which were generated for each bit mask used during each iteration, together to generate a final MST.

16. The one or more hardware storage devices of claim 15, wherein the plurality of iterations includes at least two iterations.

17. The one or more hardware storage devices of claim 15, wherein the second, lower dimensional space is a one dimensional space or a two dimensional space.

18. The one or more hardware storage devices of claim 15, wherein the plurality of data sets includes image data, and wherein a search using the final MST is performed to search through the image data.

19. The one or more hardware storage devices of claim 15, wherein a window comprising three or more nodes from the plurality of nodes is generated, and wherein edge costs as between these three or more nodes are generated.

20. The one or more hardware storage devices of claim 15, wherein a size of one or more data sets in the plurality exceeds $10^6$ elements.

* * * * *